(12) United States Patent
Lee et al.

(10) Patent No.: US 11,543,907 B2
(45) Date of Patent: Jan. 3, 2023

(54) ELECTRONIC DEVICE

(71) Applicant: Samsung Display Co., Ltd., Yongin-si (KR)

(72) Inventors: Dongchun Lee, Seoul (KR); Jinwoo Kim, Hwaseong-si (KR); Byeongkyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/243,060

(22) Filed: Apr. 28, 2021

(65) Prior Publication Data

US 2022/0057882 A1 Feb. 24, 2022

(30) Foreign Application Priority Data

Aug. 24, 2020 (KR) .................. 10-2020-0106550

(51) Int. Cl.
*G06F 3/041* (2006.01)
*G06F 3/044* (2006.01)

(52) U.S. Cl.
CPC .......... *G06F 3/0416* (2013.01); *G06F 3/0441* (2019.05); *G06F 3/0442* (2019.05); *G06F 3/0446* (2019.05)

(58) Field of Classification Search
None
See application file for complete search history.

(56) References Cited

U.S. PATENT DOCUMENTS

| 10,055,036 B2 | 8/2018 | Koike et al. |
| 10,359,885 B2 | 7/2019 | Brahma |
| 2018/0024654 A1* | 1/2018 | Koike ..................... G06F 3/041 345/174 |
| 2020/0050296 A1* | 2/2020 | Fleck .................... G06F 3/0383 |

FOREIGN PATENT DOCUMENTS

| JP | 6166497 B1 | 7/2017 |
| KR | 10-2018-0046338 A | 5/2018 |

* cited by examiner

*Primary Examiner* — Stephen T. Reed
(74) *Attorney, Agent, or Firm* — Lewis Roca Rothgerber Christie LLP

(57) ABSTRACT

An electronic device includes: a display panel configured to display an image; an input sensor comprising transmission electrodes on the display panel and reception electrodes that insulately cross the transmission electrodes; and a sensor controller configured to operate in a first mode or a second mode different from the first mode, wherein, in the first mode, the sensor controller is configured to transmit an uplink signal to an input device through the input sensor and to receive a downlink signal from the input device through the input sensor, wherein an input sensing frame, in which the sensor controller operates in the first mode, comprises an uplink period for which the uplink signal is provided to the input sensor, and the sensor controller is configured to not apply the uplink signal to at least a portion of the transmission electrodes during the uplink period.

20 Claims, 21 Drawing Sheets

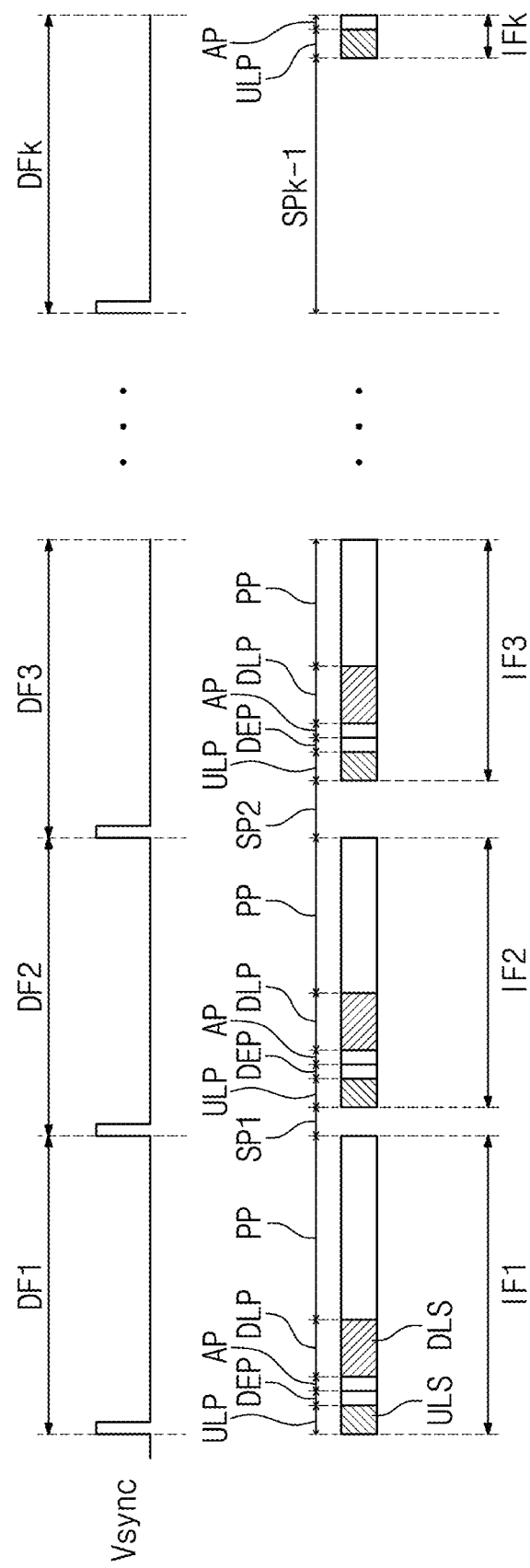

ELECTRONIC DEVICE

CROSS-REFERENCE TO RELATED APPLICATION

The present application claims priority to and the benefit of Korean Patent Application No. 10-2020-0106550, filed on Aug. 24, 2020, the entire content of which is hereby incorporated by reference.

BACKGROUND

Aspects of some embodiments of the present disclosure herein relate to an electronic device.

Multimedia electronic devices such as televisions, mobile phones, tablet computers, navigators, game consoles, and the like include a display device for displaying images. Such an electronic device may include an input sensor, which is capable of providing a touch-based input mechanism that allows a user to relatively easily input information or commands intuitively and conveniently in addition to usual input mechanisms such as a button, a keyboard, a mouse, and the like.

The input sensor may sense a touch or pressure using a user's body. There is an increasing demand for using an electronic pen for fine touch input for a user who is familiar with information input using a writing instrument or a specific application program (for example, application program for sketching or drawing).

Accordingly, the input sensor adopted for the electronic device may be utilized to sense various inputs such as an electronic pen input as well as the input by the touch or pressure through the user's body.

The above information disclosed in this Background section is only for enhancement of understanding of the background and therefore the information discussed in this Background section does not necessarily constitute prior art.

SUMMARY

Aspects of some embodiments of the present disclosure herein relate to an electronic device, and for example, to an electronic device having relatively improved display quality.

Aspects of some embodiments of the present disclosure provides an electronic device that is capable of preventing or reducing deterioration of display quality when an input is sensed.

According to some embodiments of the inventive concept, an electronic device includes a display panel configured to display an image, an input sensor including transmission electrodes on the display panel and reception electrodes that insulately cross the transmission electrodes, and a sensor controller configured to operate in a first mode or a second mode different from the first mode. The sensor controller transmits an uplink signal to an input device through the input sensor and receives a downlink signal from the input device through the input sensor in the first mode.

According to some embodiments an input sensing frame, in which the sensor controller operates in the first mode, includes an uplink period for which the uplink signal is provided to the input sensor, and the sensor controller does not apply the uplink signal to at least a portion of the transmission electrodes during the uplink period.

According to some embodiments of the inventive concept, an electronic device includes a display panel configured to display an image during a display frame, an input sensor including transmission electrodes on the display panel and reception electrodes that insulately cross the transmission electrodes, and a sensor controller configured to operate in a first mode or a second mode different from the first mode. The sensor controller transmits an uplink signal to an input device through the input sensor and receives a downlink signal from the input device through the input sensor in the first mode.

According to some embodiments, an input sensing frame, in which the sensor controller operates in the first mode, includes an uplink period for which the uplink signal is provided to the input sensor. A start time point of the uplink period during k input sensing frames is shifted or delayed from a start time point of the display frame in a unit of one input sensing frame.

According to some embodiments, the sensor controller does not apply the uplink signal to at least a portion of the transmission electrodes during the uplink period.

BRIEF DESCRIPTION OF THE FIGURES

The accompanying drawings are included to provide a further understanding of the inventive concept, and are incorporated in and constitute a part of this specification. The drawings illustrate aspects of some example embodiments of the inventive concept and, together with the description, serve to explain aspects of some embodiments of the inventive concept. In the drawings:

FIGS. 9A and 9B are waveform diagrams for explaining an operation in the first mode of the sensor controller according to some embodiments of the inventive concept;

DETAILED DESCRIPTION

Figure 1:
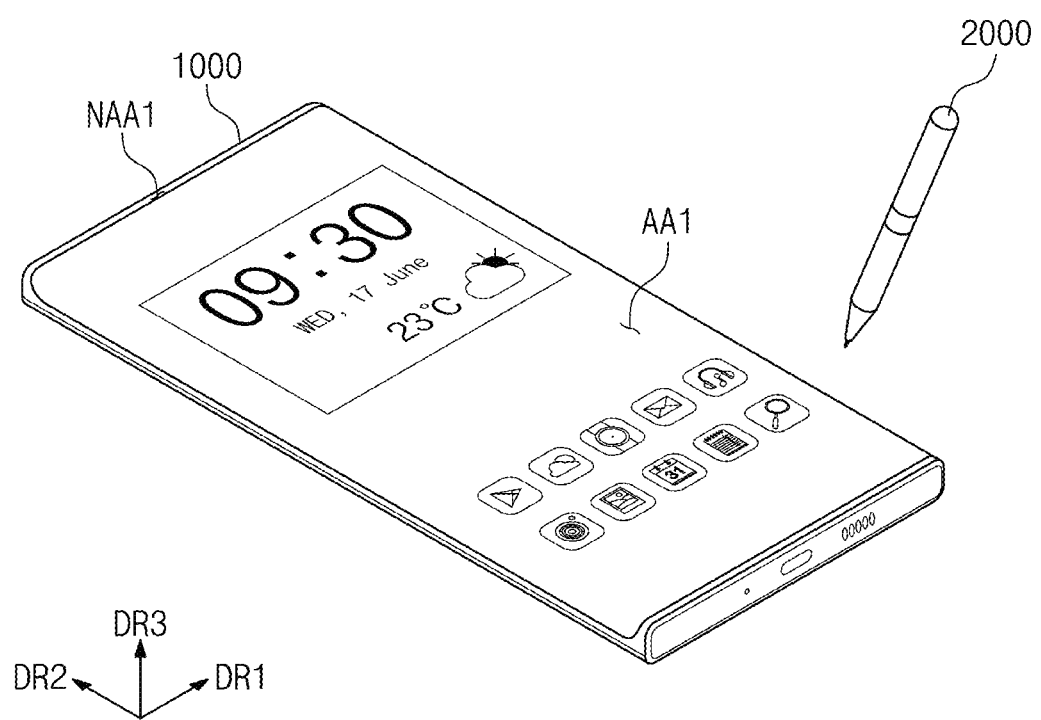
FIGS. 1 and 2 are perspective views of an electronic device and an input device according to some embodiments of the inventive concept.

In this specification, it will also be understood that when one component (or region, layer, portion) is referred to as being 'on', 'connected to', or 'coupled to' another component, it can be directly located/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above', "upper", and the like are used for explaining relation association of components illustrated in the drawings. The terms may be a relative concept and described based on directions expressed in the drawings.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, aspects of some embodiments of the inventive concept will be described in more detail with reference to the accompanying drawings.

FIG. 1 is a perspective view of an electronic device and an input device according to some embodiments of the inventive concept.

Referring to FIG. 1, an electronic device 1000 may be a device that is activated according to an electrical signal. For example, the electronic device 1000 may be a mobile phone, a tablet PC, a car navigation system, a game console, or a wearable device, but embodiments according to the present disclosure are not specifically limited thereto, and may include any other suitable type of electronic device. FIG. 1 illustrates an example in which the electronic device 1000 is provided as the mobile phone.

An active area AA1 and a peripheral area NAA1 may be defined on the electronic device 1000. The electronic device 1000 may display images at the active area AA1. The active area AA1 may include a surface (e.g., a display surface or primary display surface) defined by, or parallel to a plane defined by, a first direction DR1 and a second direction DR2. The peripheral area NAA1 may surround the active area AA1. Thus, the peripheral area NAA1 may be in a periphery of, or outside a footprint of, the active area AA1.

A thickness direction of the electronic device 1000 may be parallel to a third direction DR3 crossing the first direction DR1 and the second direction DR2. Thus, a front surface (or top surface) and a rear surface (or bottom surface) of each of members constituting the electronic device 1000 may be defined based on the third direction DR3.

The electronic device 1000 illustrated in FIG. 1 may sense an input by a user's touch and an input by an input device 2000. The input device 2000 may refer to a device other than the user's body. An input by the input device 2000 may be referred to as a first input. For example, the input device 2000 may be an active pen, a stylus pen, a touch pen, or an electronic pen. An input by the user may be referred to as a second input. The second input may include various types of external inputs such as a portion of the user's body, light, heat, or a pressure.

The electronic device 1000 and the input device 2000 may perform bidirectional communication. The electronic device 1000 may provide an uplink signal to the input device 2000. For example, the uplink signal may include a synchronization signal or information of the electronic device 1000, but embodiments according to the present disclosure are not particularly limited thereto. The input device 2000 may provide a downlink signal to the electronic device 1000. The downlink signal may include a synchronization signal or state information of the input device 2000. For example, the downlink signal may include position information of the input device 2000, battery information of the input device 2000, inclination information of the input device 2000, and/or various information stored in the input device 2000, but embodiments according to the present disclosure are not particularly limited thereto. The uplink signal and the downlink signal will be described more detail later.

Figure 2:
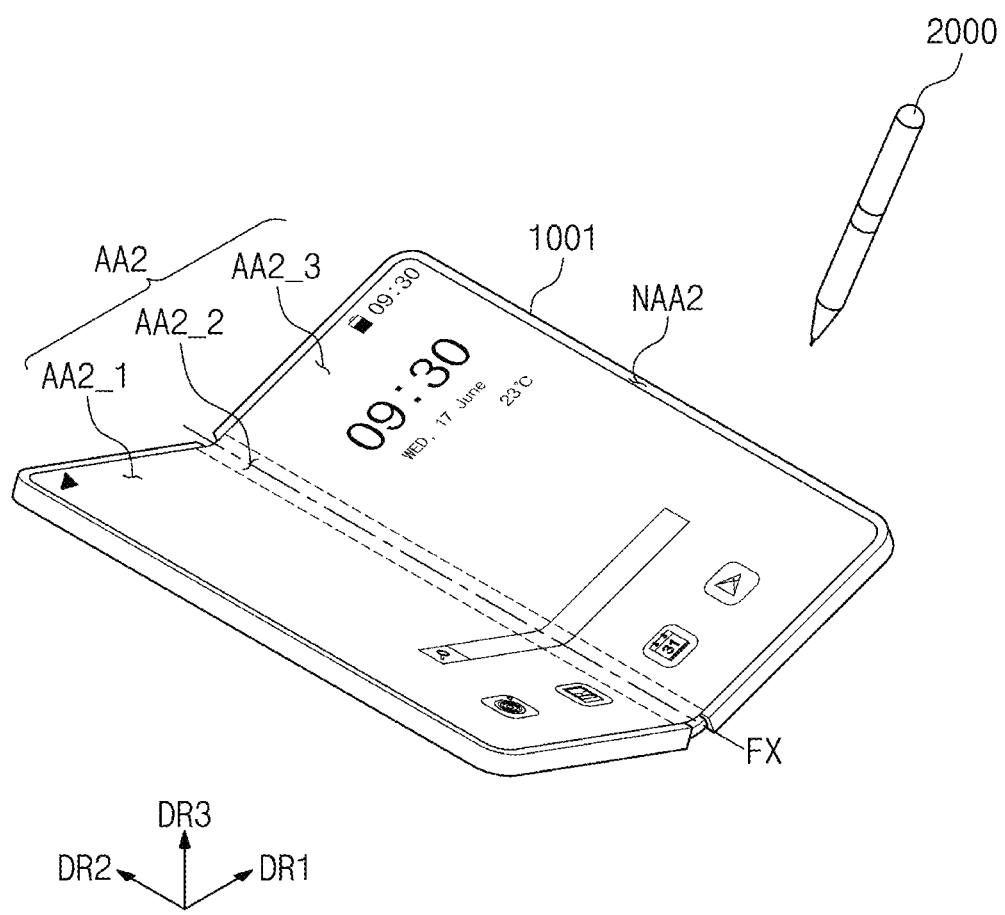

FIG. 2 is a perspective view of the electronic device and the input device according to some embodiments of the inventive concept. In describing FIG. 2, the same reference numerals are used for the components described through FIG. 1, and descriptions thereof will be omitted.

Referring to FIG. 2, an electronic device 1001 may display images at an active area AA2. FIG. 2 illustrates a state in which the electronic device 1001 is folded at an angle (e.g., a set or predetermined angle). In the state in which the electronic device 1001 is unfolded, the active area AA2 may include a plane defined by the first direction DR1 and the second direction DR2.

The active area AA2 may include a first area AA2_1, a second area AA2_2, and a third area AA2_3. The first area AA2_1, the second area AA2_2, and the third area AA2_3 may be sequentially defined in the first direction DR1. The second area AA2_2 may be bent with respect to a folding axis FX extending along the second direction DR2. Thus, the first area AA2_1 and the third area AA2_3 may be referred to as non-folding areas, and the second area AA2_2 may be referred to as a folding area.

When the electronic device 1001 is folded, the first area AA2_1 and the third area AA2_3 may face each other. Thus, in the fully folded state, the active area AA2 may not be exposed to the outside, which may be referred to as in-folding. However, this is merely an example, and a folding operation of the electronic device 1001 is not limited thereto.

For example, according to some embodiments of the inventive concept, the electronic device 1001 may be folded so that the first area AA2_1 and the third area AA2_3 are opposite to each other. In this case, the active area AA2 may be exposed to the outside, which may be referred to as out-folding.

The electronic device 1001 may perform only one operation of the in-folding and the out-folding. Alternatively, the electronic device 1001 may perform all the operations of the in-folding and the out-folding. In this case, the second area AA2_2 of the electronic device 1001 may be in-folded and out-folded.

FIG. 2 illustrates one folding area and two non-folding areas as an example, but the number of folding and non-folding areas is not limited thereto. For example, the electronic device 1001 may include more than two folding areas, i.e., a plurality of non-folding areas and a plurality of folding areas located between the non-folding areas adjacent to each other.

FIG. 2 illustrates that the folding axis FX extends in the second direction DR2 as an example, but the embodiments according to the inventive concept are not limited thereto. For example, the folding axis FX may extend in a direction parallel to the first direction DR1. In this case, the first area AA2_1, the second area AA2_2, and the third area AA2_3 may be sequentially arranged along the second direction DR2.

The active area AA2 may overlap at least one electronic module. For example, the electronic modules may include a camera module and a proximity illuminance sensor. The electronic modules may receive an external input transmitted through the active area AA2 or may provide an output through the active area AA2. A portion of the active area AA2 overlapping the camera module and the proximity illuminance sensor may have a transmittance greater than that of the other portion of the active area AA2. Thus, an area, on which the electronic modules are located, may not be provided to a peripheral area NAA2 around the active area AA2. As a result, an area ratio of the active area AA1 to the front surface of the electronic device 1001 may increase.

The electronic device 1001 and the input device 2000 may bidirectionally communicate with each other. The electronic device 1001 may provide an uplink signal to the input device 2000. The input device 2000 may provide a downlink signal to the electronic device 1001. The electronic device 1001 may sense a position of the input device 2000 by using a signal provided from the input device 2000.

Figure 3:
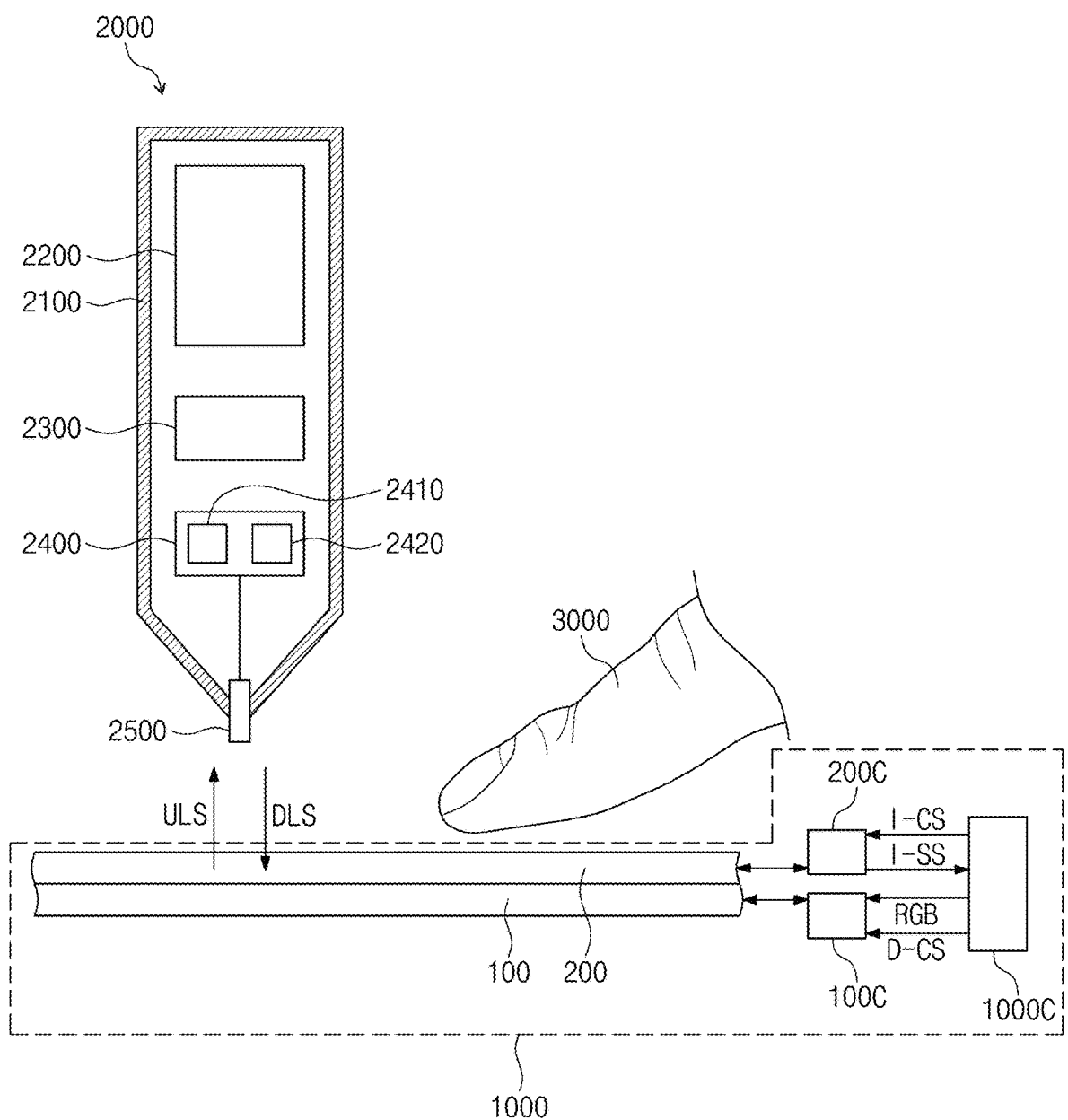
FIG. 3 is a schematic block diagram illustrating the electronic device and the input device according to some embodiments of the inventive concept.

FIG. 3 is a schematic block diagram illustrating the electronic device and the input device according to some embodiments of the inventive concept.

Referring to FIG. 3, the electronic device 1000 may include a display panel 100, an input sensor 200, a panel driver 100C, a sensor controller 200C, and a main controller 1000C.

The display panel 100 may be configured to substantially generate an image. The display panel 100 may be an emission-type display layer. For example, the display panel 100 may be an organic light emitting display panel, a quantum dot display panel, a micro LED display panel, or a nano LED display panel.

The input sensor 200 may be located on the display panel 100. The input sensor 200 may sense an external input applied from the outside. The input sensor 200 may sense a first input by the input device 2000 and a second input by a user's body 3000.

The main controller 1000C may control an overall operation of the electronic device 1000. For example, the main controller 1000C may control operations of the panel driver 100C and the sensor controller 200C. The main controller 1000C may include at least one microprocessor, and the main controller 1000C may be referred to as a host.

The panel driver 100C may control an operation of the display panel 100. The main controller 1000C may further include a graphic controller. The panel driver 100C may receive image data RGB and a control signal D-CS from the main controller 1000C. The control signal D-CS may include various signals. For example, the control signal D-CS may include a vertical synchronization signal, a horizontal synchronization signal, a main clock, and a data enable signal. The panel driver 100C may generate a vertical start signal and a horizontal start signal for controlling timing of providing a signal to the display panel 100 based on the control signal D-CS.

The sensor controller 200C may control the input sensor 200. The sensor controller 200C may receive a sensing control signal I-CS from the main controller 1000C. The sensing control signal I-CS may include a mode determination signal and a clock signal for determining a driving mode of the sensor controller 200C. The sensor controller 200C may operate in a first mode, in which the first input by the input device 2000 is sensed, and a second mode in which, the second input by the user's body 3000 is sensed, on the basis of the sensing control signal I-CS. The sensor controller 200C may control the input sensor 200 in the first mode or the second mode to be described later based on the mode determination signal.

The sensor controller 200C may calculate coordinate information of the first input or the second input based on the signal received from the input sensor 200 and provide a coordinate signal I-SS having the coordinate information to the main controller 1000C. The main controller 1000C executes an operation corresponding to a user input based on the coordinate signal I-SS. For example, the main controller 1000C may allow the panel driver 100C to operate so that a new application image is displayed on the display panel 100 based on the coordinate signal I-SS.

The input device 2000 may include a housing 2100, a power source 2200, a pen controller 2300, a communication module 2400, and a pen electrode 2500. However, components constituting the input device 2000 are not limited to the components listed above. For example, the input device 2000 may further include an electrode switch for conversion to a signal transmission mode or a signal reception mode, a pressure sensor for sensing a pressure, a memory for storing information (e.g., set or predetermined information), a rotation sensor for sensing rotation, or the like.

The housing 2100 may have a pen shape, and an accommodation space may be defined in the housing 2100. The power source 2200, the pen controller 2300, the communication module 2400, and the pen electrode 2500 may be accommodated in an accommodation space defined inside the housing 2100.

The power source 2200 may supply power to the pen controller 2300 and the communication module 2400 inside the input device 2000. The power source 2200 may include a battery or a high-capacity capacitor.

The pen controller 2300 may control an operation of the input device 2000. The pen controller 2300 may be an application-specific integrated circuit (ASIC). The pen controller 2300 may be configured to operate according to designed program.

The communication module 2400 may include a transmission circuit 2410 and a reception circuit 2420. The transmission circuit 2410 may output a downlink signal DLS to the input sensor 200. The reception circuit 2420 may receive an uplink signal ULS provided from the input sensor 200. The transmission circuit 2410 may receive a signal provided from the pen controller 2300 to modulate the signal to a signal that is capable of being sensed by the input sensor 200, and the reception circuit 2420 may modulate the signal provided from the input sensor 200 to a signal that is capable of being processed by the pen controller 2300.

The pen electrode 2500 may be electrically connected to the communication module 2400. A portion of the pen electrode 2500 may protrude from the housing 2100. Alternatively, the input device 2000 may further include a cover housing that covers the pen electrode 2500 exposed from the housing 2100. Alternatively, the pen electrode 2500 may be embedded in the housing 2100.

Figure 4A:
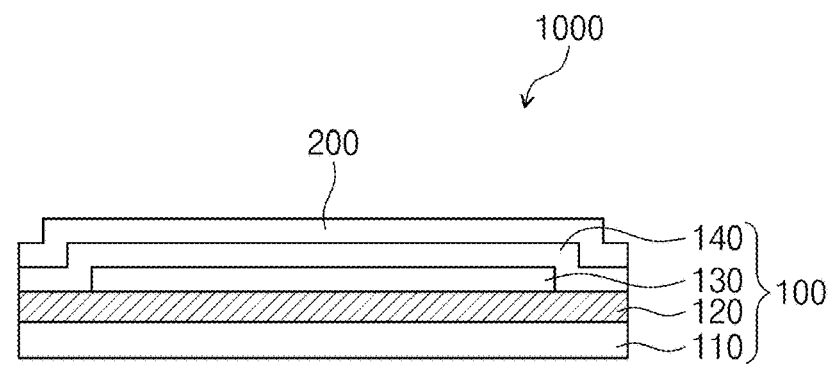
FIGS. 4A and 4B are cross-sectional views of an electronic device according to some embodiments of the inventive concept.
Figure 4A:
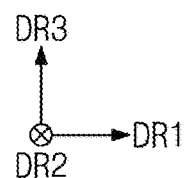

FIG. 4A is a cross-sectional view of the electronic device according to some embodiments of the inventive concept.

Referring to FIG. 4A, the electronic device 1000 may include a display panel 100 and an input sensor 200. The display panel 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, the embodiments of the inventive concept are not limited thereto. For example, the base layer 110 may be an inorganic layer, an organic layer, or a composite layer.

The base layer 110 may have a multilayered structure. For example, the base layer 110 includes a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a base barrier layer.

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, or a perylene-based resin.

The circuit layer 120 may be located on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating or vapor deposition, and then, the insulating layer, the semiconductor layer, and the conductive layer may be selectively patterned through a plurality of photolithography processes. Thereafter, the semiconductor pattern, the conductive pattern, and the signal line included in the circuit layer 120 may be provided.

The light emitting element layer 130 may be located on the circuit layer 120. The light emitting element layer 130 may include a light emitting element. For example, the light emitting element layer 130 may include an organic light emitting material, quantum dots, quantum rods, a micro LED, or a nano LED.

The encapsulation layer 140 may be located on the light emitting element layer 130. The encapsulation layer 140 may protect the display element layer 130 against foreign substances such as moisture, oxygen, and dust particles.

The input sensor 200 may be located on the display panel 100 through a continuous process. In this case, the input sensor 200 may be expressed as being directly arranged on the display panel 100. The direct arrangement may mean that a third component is not located between the input sensor 200 and the display panel 100. That is, a separate adhesive member may not be located between the input sensor 200 and the display panel 100. Alternatively, the input sensor 200 may be bonded to the display panel 100 through an adhesive member. The adhesive member may include a common adhesive or an adhesive agent.

Figure 4B:
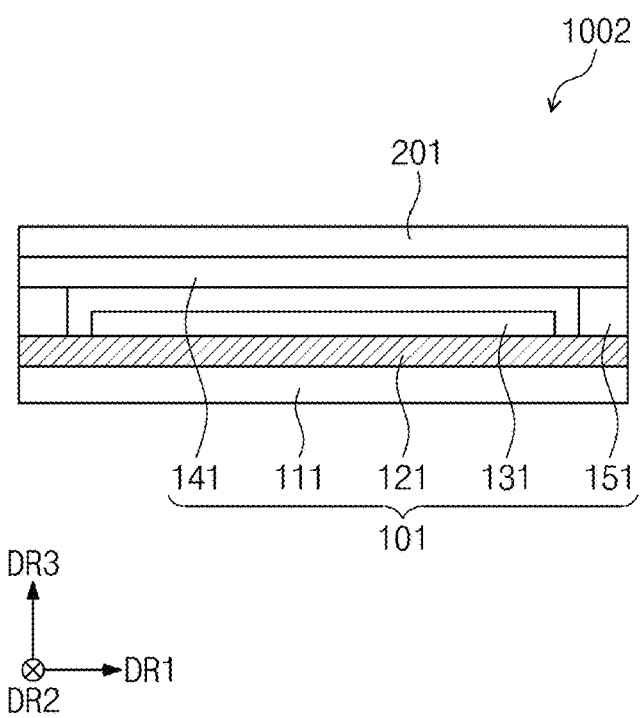
Figure 4B:
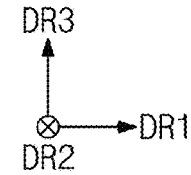

FIG. 4B is a cross-sectional view of an electronic device according to some embodiments of the inventive concept.

Referring to FIG. 4B, an electronic device 1002 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, or a polymer substrate, but is not particularly limited thereto.

The coupling member 151 may be located between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photocurable resin or a photoplastic resin. However, a material forming the coupling member 151 is not limited to the above example.

The input sensor 201 may be directly arranged on the encapsulation substrate 141. The direct arrangement may mean that a third component is not located between the input sensor 201 and the encapsulation substrate 141. That is, a separate adhesive member may not be located between the input sensor 201 and the display panel 101. However, the embodiments of the inventive concept are not limited thereto. For example, an adhesive layer may be further located between the input sensor 201 and the encapsulation substrate 141.

Figure 5:
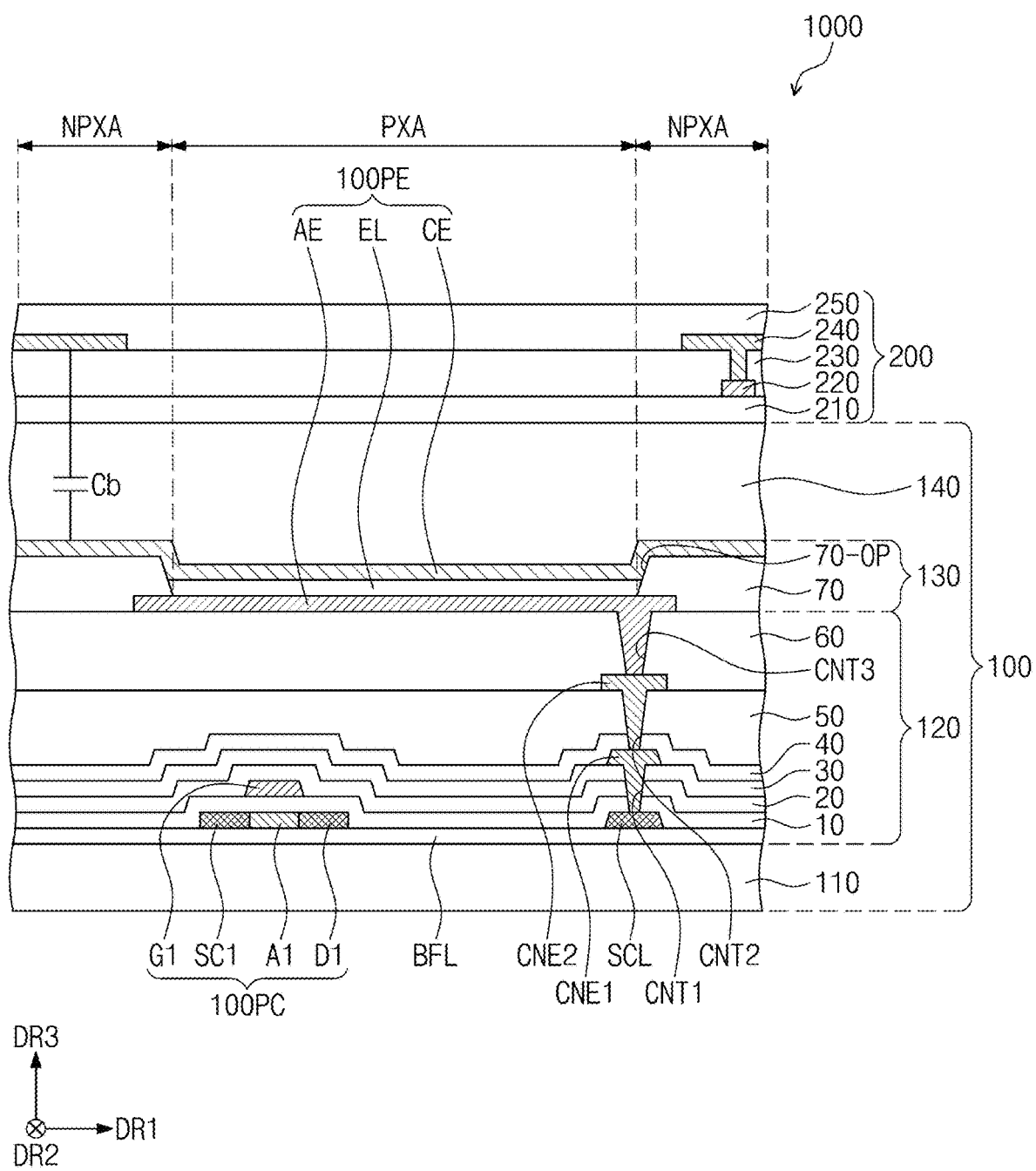
FIG. 5 is a cross-sectional view of a display module according to some embodiments of the inventive concept.

FIG. 5 is a cross-sectional view of a display module according to some embodiments of the inventive concept; In description in FIG. 5, the same reference numerals are used for components described in FIG. 4A, and descriptions thereof are omitted.

Referring to FIG. 5, at least one inorganic layer may be located on a top surface of the base layer 110. The inorganic layer may include at least one of aluminum oxide, titanium oxide, silicon oxide silicon oxynitride, zirconium oxide, or hafnium oxide. The inorganic layer may be provided as a multilayer. The multilayered inorganic layer may constitute a barrier layer and/or a buffer layer. In FIG. 5, the display panel 100 is illustrated as including a buffer layer BFL, but embodiments are not limited thereto.

The buffer layer BFL may improve bonding force between the base layer 110 and the semiconductor pattern. The buffer layer BFL may include a silicon oxide layer and a silicon nitride layer, and the silicon oxide layer and the silicon nitride layer may be alternately laminated.

The semiconductor pattern may be located on the buffer layer BFL. The semiconductor pattern may include polysilicon. However, the embodiments of the inventive concept are not limited thereto. For example, according to some embodiments, the semiconductor pattern may include amorphous silicon, low-temperature polycrystalline silicon, or an oxide semiconductor.

FIG. 5 illustrates merely a portion of the semiconductor pattern. For example, the semiconductor pattern may be further located on other areas. The semiconductor pattern may be arranged in a specific rule over pixels. The semiconductor pattern has different electrical properties depending on whether the semiconductor pattern is doped. The semiconductor pattern may include a first region having high conductivity and a second region having low conductivity. The first area may be doped with an N-type dopant or a P-type dopant. A P-type transistor may include a doped region doped with the P-type dopant, and an N-type transistor may include a doped region doped with the N-type dopant. The second region may be a non-doped region or may be doped at a concentration less than that of the first area.

The first region may have conductivity greater than that of the second region and may substantially serve as an electrode or a signal line. The second region may substantially correspond to an active (or channel) of the transistor. That is to say, a portion of the semiconductor pattern may be an active of the transistor, another portion may be a source or drain of the transistor, and further another portion may be a connection electrode or a connection signal line.

Each of the pixels may have an equivalent circuit including seven transistors, one capacitor, and a light emitting element, and an equivalent circuit diagram of the pixel may be modified in various forms. In FIG. 5, one transistor 100PC and a light emitting element 100PE provided in the pixel are illustrated as an example, but embodiments are not limited thereto.

The transistor 100PC may include a source SC1, an active A1, a drain D1, and a gate G1. The source SC1, the active A1, and the drain D1 may be formed from the semiconductor pattern. The source SC1 and the drain D1 may extend in opposite directions from the active A1 on a cross-section. FIG. 5 illustrates a portion of a connection signal line SCL formed from the semiconductor pattern. Although not particularly shown, the connection signal line SCL may be connected to the drain D1 of the transistor 100PC on the plane.

A first insulating layer 10 may be located on the buffer layer BFL. The first insulating layer 10 commonly overlaps a plurality of pixels PX to cover the semiconductor pattern. The first insulating layer 10 may include an inorganic layer and/or an organic layer and have a single-layered or multilayered structure. The first insulating layer 10 may include at least one of aluminum oxide, titanium oxide, silicon oxide, silicon nitride, silicon oxynitride, zirconium oxide, or hafnium oxide. In FIG. 5, the first insulating layer 10 may include a single-layered silicon oxide layer, but embodiments are not limited thereto. The insulating layer of the circuit layer 120, which will be described in more detail later, as well as the first insulating layer 10 may be an inorganic layer and/or an organic layer and may have a single-layered or a multilayered structure. The inorganic layer may include at least one of the above-described materials, but embodiments according to the present disclosure are not limited thereto.

The gate G1 is located on the first insulating layer 10. The gate G1 may be a portion of a metal pattern. The gate G1 overlaps the active A1. In the process in which the semiconductor pattern is doped, the gate G1 may function as a mask.

A second insulating layer 20 may be located on the first insulating layer 10 to cover the gate G1. The second insulating layer 20 may commonly overlap the pixels. The second insulating layer 20 may be an inorganic layer and/or an organic layer and have a single-layered or multilayered structure. The second insulating layer 20 may include at least one of silicon oxide, silicon nitride, or silicon oxynitride. According to some embodiments, the second insulating layer 20 may have a multilayer structure including a silicon oxide layer and a silicon nitride layer.

A third insulating layer 30 may be located on the second insulating layer 20. The third insulating layer 30 may has a single layer or multilayer structure. For example, the third insulating layer 30 may have a multilayer structure including a silicon oxide layer and a silicon nitride layer.

A first connection electrode CNE1 may be located on the third insulating layer 30. The first connection electrode CNE1 may be connected to the connection signal line SCL through a contact hole CNT1 passing through the first to third insulating layers 10 to 30.

A fourth insulating layer 40 may be located on the third insulating layer 30. The fourth insulating layer 40 may be a single-layered silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT2 passing through the fourth insulating layer 40 and the fifth insulating layer 50.

A sixth insulating layer 60 may be located on the fifth insulating layer 50 to cover the second connection electrode CNE2. The sixth insulating layer 60 may be an organic layer.

The light emitting element layer 130 may be located on the circuit layer 120. The light emitting element layer 130 may include a light emitting element 100PE. For example, the light emitting element layer 130 may include an organic light emitting material, quantum dots, quantum rods, a micro LED, or a nano LED. Hereinafter, the light emitting element 100PE is described as an example of an organic light emitting element, but is not particularly limited thereto.

The light emitting element 100PE may include a first electrode AE, an emission layer EL, and a second electrode CE. The first electrode AE may be located on the sixth insulating layer 60. The first electrode AE may be connected to the second connection electrode CNE2 through a contact hole CNT3 passing through the sixth insulating layer 60.

A pixel defining layer 70 may be located on the sixth insulating layer 60 to cover a portion of the first electrode AE. An opening 70-OP is defined in the pixel defining layer 70. The opening 70-OP of the pixel defining layer 70 exposes at least a portion of the first electrode AE.

The active area AA1 (see FIG. 1) may include an emission area PXA and a non-emission area NPXA adjacent to the emission area PXA. The non-emission area NPXA may surround the emission area PXA. According to some embodiments, the emission area PXA may be defined to correspond to a portion of an area of the first electrode AE, which is exposed by the opening 70-OP.

The emission layer EL may be located on the first electrode AE. The emission layer EL may be located on an area corresponding to the opening 70-OP. That is, the emission layer EL may be arranged to be separated from each of the pixels. When the emission layer EL is arranged to be separated from each of the pixels, each of the emission layers EL may emit light having at least one of blue, red, or green color. However, the embodiments of the inventive concept are not limited thereto. For example, the emission layer EL may be commonly provided to be connected to the pixels. In this case, the emission layer EL may provide blue light or white light.

The second electrode CE may be located on the emission layer EL. The second electrode CE may have an integrated shape and is commonly arranged on the plurality of pixels.

According to some embodiments, a hole control layer may be located between the first electrode AE and the emission layer EL. The hole control layer may be commonly arranged on the emission area PXA and the non-emission area NPXA. The hole control layer may include a hole transport layer and may further include a hole injection layer. An electron control layer may be located between the emission layer EL and the second electrode CE. The electron control layer may include an electron transport layer and may further include an electron injection layer. The hole control layer and the electron control layer may be commonly formed in the plurality of pixels by using an open mask.

The encapsulation layer 140 may be located on the light emitting element layer 130. The encapsulation layer 140 may include an inorganic layer, an organic layers, and an inorganic layer, which are sequentially laminated, but layers constituting the encapsulation layer 140 are not limited thereto.

The inorganic layers may protect the light emitting element layer 130 against moisture and oxygen, and the organic layer may protect the light emitting element layer 130, against foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but the embodiments of the inventive concept are not limited thereto.

The input sensor 200 may be located on the display panel 100 through a continuous process. In this case, the input sensor 200 may be expressed as being directly located on the display panel 100. Alternatively, the input sensor 200 may be bonded to the display panel 100 through an adhesive member. The adhesive member may include a common adhesive or an adhesive agent.

The input sensor 200 may include a base insulating layer 210, a first conductive layer 220, a sensing insulating layer 230, a second conductive layer 240, and a cover insulating layer 250.

The base insulating layer 210 may be an inorganic layer including at least one of silicon nitride, silicon oxynitride, or silicon oxide. Alternatively, the base insulating layer 210 may be an organic layer including an epoxy resin, an acrylic resin, or an imide-based resin. The base insulating layer 210 may have a single-layered structure or a multilayered structure in which a plurality of layers are laminated in the third direction DR3.

Each of the first conductive layer 220 and the second conductive layer 240 may have a single-layered structure or a multilayered structure in which a plurality of layers are laminated in the third direction DR3.

The conductive layer having the single-layered structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include conductive polymers such as PEDOT, metal nanowires, graphene, and the like.

The conductive layer having the multilayered structure may include metal layers. The metal layers may have a three-layered structure of titanium/aluminum/titanium. The conductive layer having the multilayered structure may include at least one metal layer and at least one transparent conductive layer.

At least one of the sensing insulating layer 230 or the cover insulating layer 250 may include an inorganic layer. The inorganic layer may include at least one of aluminum oxide, titanium oxide, silicon oxide, silicon nitride, silicon oxynitride, zirconium oxide, or hafnium oxide.

At least one of the sensing insulating layer 230 or the cover insulating layer 250 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

A parasitic capacitance Cb may be generated between the input sensor 200 and the display panel 100. As a distance between the input sensor 200 and the display panel 100 decreases, a value of the parasitic capacitance Cb may increase. As the parasitic capacitance Cb increases, a flicker may be visually recognized on an image displayed on the display panel 100 when an input is sensed. Particularly, when the uplink signal ULS (see FIG. 3) is transmitted to the input device 2000 (see FIG. 3) through the input sensor 200, the flicker may be visually recognized on an area on which timing at which the uplink signal ULS is applied and a timing at which a scan signal is applied to the display panel 100 match each other.

Figure 6:
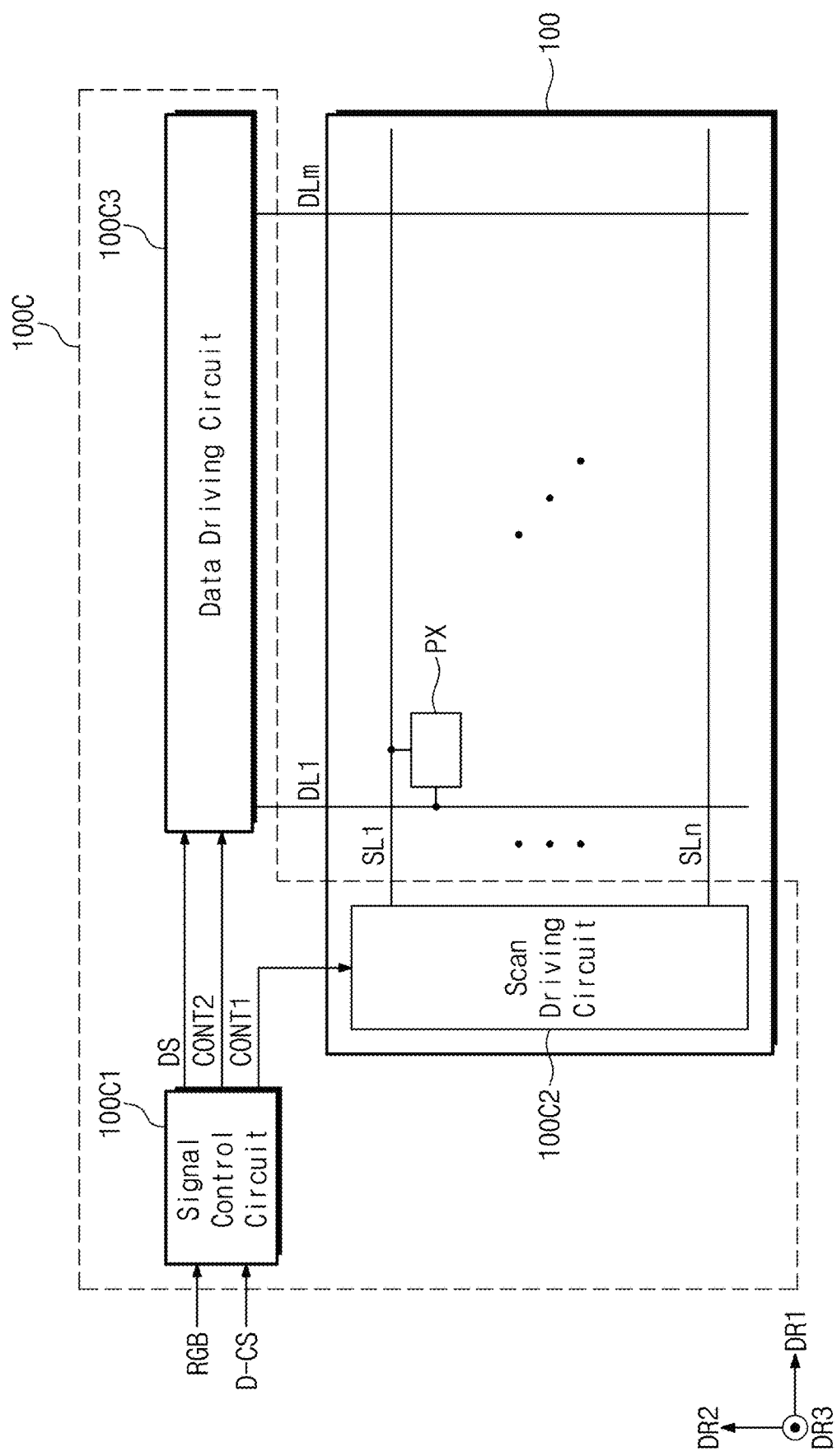
FIG. 6 is a block diagram of a display panel and a panel driver according to some embodiments of the inventive concept.

FIG. 6 is a block diagram of the display panel and the panel driver according to some embodiments of the inventive concept.

Referring to FIG. 6, the display panel 100 may include a plurality of scan lines SL1 to SLn, a plurality of data lines DL1 to DLm, and a plurality of pixels PX. Each of the plurality of pixels PX may be connected to a corresponding data line of the plurality of data lines DL1 to DLm and may be connected to a corresponding scan line of the plurality of scan lines SL1 to SLn. According to some embodiments of the inventive concept, the display panel 100 may further include light emitting control lines, but the constituent of the display panel 100 is not particularly limited.

The panel driver 100C may include a signal control circuit 100C1, a scan driving circuit 100C2, and a data driving circuit 100C3. The panel driver 100C may further include a light emitting driving circuit that provides control signals to the light emitting control lines.

The signal control circuit 100C1 may receive image data RGB and a control signal D-CS from the main controller 1000C (see FIG. 3). The control signal D-CS may include various signals. For example, the control signal D-CS may include a vertical synchronization signal, a horizontal synchronization signal, a main clock, and a data enable signal.

The signal control circuit 100C1 may generate a first control signal CONT1 based on the control signal D-CS and output the first control signal CONT1 to the scan driving circuit 100C2. The first control signal CONT1 may include a vertical start signal and a clock signal.

The signal control circuit 100C1 may generate a second control signal CONT2 based on the control signal D-CS and output the second control signal CONT2 to the data driving circuit 100C3. The second control signal CONT2 may include a horizontal start signal and an output enable signal.

Also, the signal control circuit 100C1 may output a data signal DS obtained by processing the image data RGB according to an operation condition of the display panel 100 to the data driving circuit 100C3. The first control signal CONT1 and the second control signal CONT2 may be signals required for the operations of the scan driving circuit 100C2 and the data driving circuit 100C3, respectively, and also are not particularly limited.

The scan driving circuit 100C2 may drive the plurality of scan lines SL1 to SLn in response to the first control signal CONT1. The scan driving circuit 100C2 may sequentially apply a scan signal to the plurality of scan lines SL1 to SLn. According to some embodiments of the inventive concept, the scan driving circuit 100C2 may be formed through the same process as the circuit layer 120 (see FIG. 5) in the display panel 100, but is not limited thereto. For example, the scan driving circuit 100C2 may be implemented as an integrated circuit (IC) and thus be directly mounted on an area (e.g., a set or predetermined area) of the display panel 100 or be mounted on a separate printed circuit board in a chip on film (COF) manner so as to be electrically connected to the display panel 100.

The data driving circuit 100C3 may output gradation voltages for driving the plurality of data lines DL1 to DLm in response to the second control signal CONT2 and the data signal DS from the signal control circuit 100C1. The data driving circuit 100C3 may be implemented as an integrated circuit and thus be directly mounted on an area (e.g., a set or predetermined area) of the display panel 100 or be mounted on a separate printed circuit board in a chip on film manner so as to be electrically connected to the display panel 100, but is not particularly limited thereto. For example, the data driving circuit 100C3 may be formed through the same process as the circuit layer 120 (see FIG. 5) in the display panel 100.

Figure 7A:
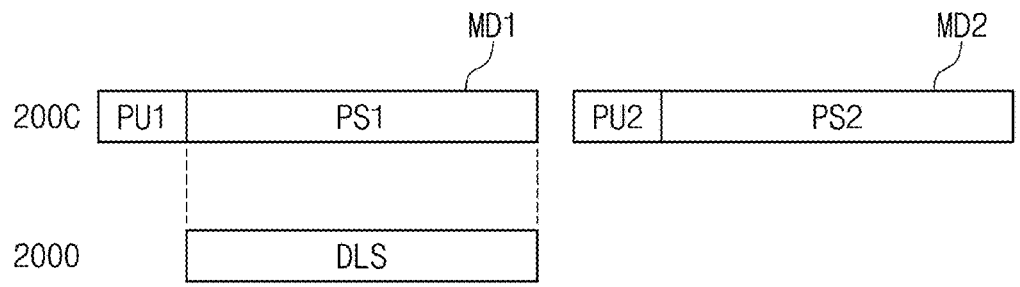
FIG. 7A is a conceptual view illustrating operations of a first mode and a second mode according to some embodiments of the inventive concept.

FIG. 7A is a conceptual view illustrating operations of a first mode and a second mode according to some embodiments of the inventive concept.

Referring to FIGS. 3 and 7A, the sensor controller 200C may operate in a first mode MD1 in which the first input by the input device 2000 is sensed or a second mode MD2 in which the second input by the user's body 3000 is sensed.

The first mode MD1 may include a first period PU1 and a second period PS1. The second period PS1 may proceed after the first period PU1. During the first period PU1, the sensor controller 200C may transmit an uplink signal ULS to the input sensor 200. The first period PU1 may be referred to as an uplink period. During the second period PS1, the sensor controller 200C may receive a downlink signal DLS provided from the input device 2000 through the input sensor 200. The second period PS1 may include a downlink period for which the downlink signal DLS is received. The input sensor 200 may sense the first input of the input device 2000 based on the downlink signal DLS.

The sensor controller 200C may operate in the second mode MD2 after the first mode MD1 is ended. The first mode MD1 and the second mode MD2 may be repeated with each other.

The second mode MD2 may include a first period PU2 and a second period PS2. The second period PS2 may proceed after the first period PU2. During the first period PU2, the sensor controller 200C may transmit the uplink signal ULS to the input sensor 200. During the second period PS2, the sensor controller 200C may detect the second input by the user's body 3000.

The input device 2000 may provide a response signal for the uplink signal ULS to the input sensor 200. When the sensor controller 200C receives the response signal sensed by the input sensor 200 for the first period PU1, the sensor controller 200C may operate for the second period PS1 of the first mode MD1. When the sensor controller 200C does not receive the response signal from the input device 2000 for the first period PU2, the sensor controller 200C may operate for the second period PS2 of the second mode MD2. Thus, the sensor controller 200C may periodically monitor whether the input device 2000 exists to easily sense the first input by the input device 2000. However, this is merely an example, and thus, the operation of the sensor controller 200C is not particularly limited.

Figure 7B:
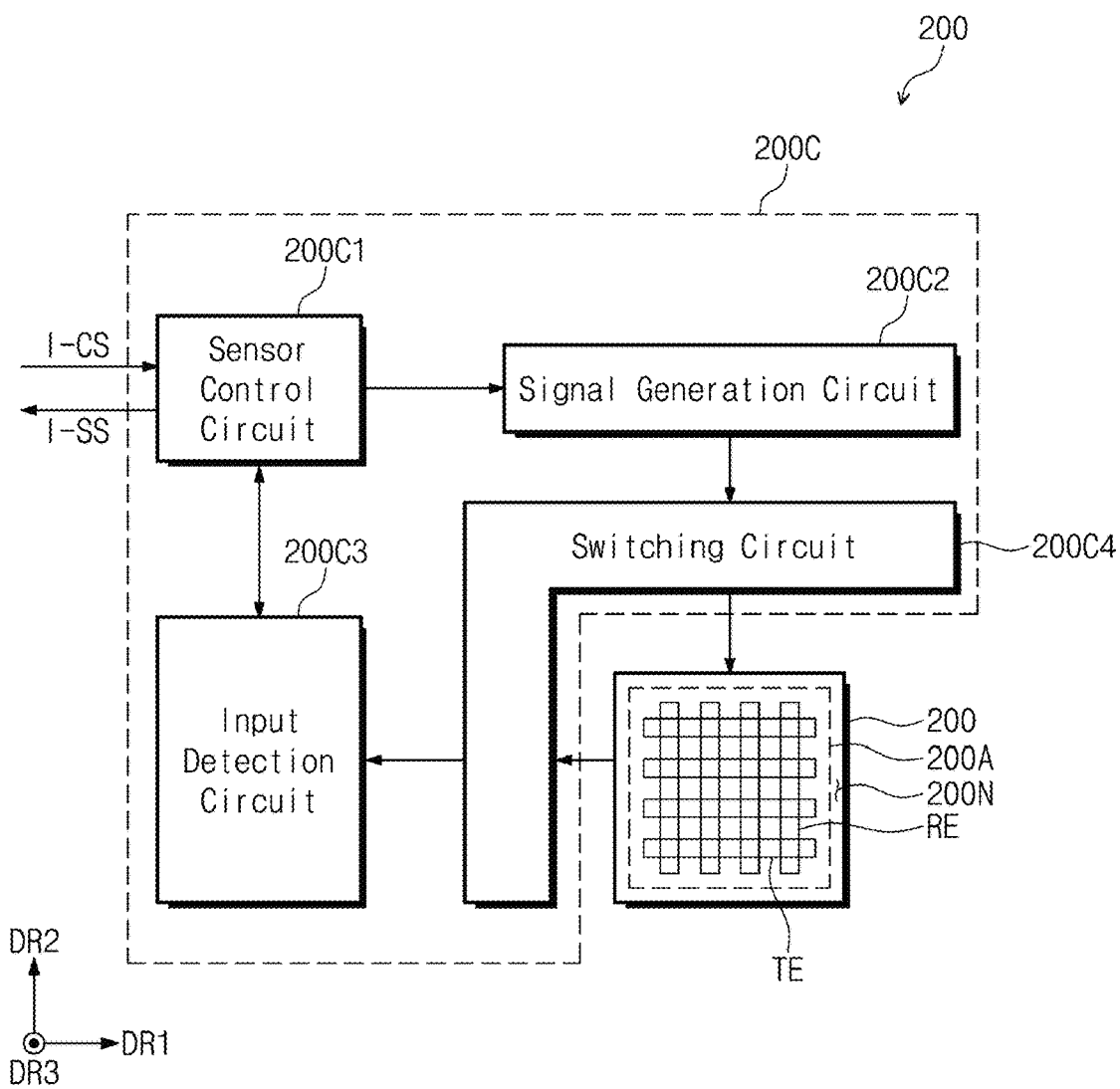
FIG. 7B is a block diagram of an input sensor and a sensor controller according to some embodiments of the inventive concept.

FIG. 7B is a block diagram of the input sensor and the sensor controller according to some embodiments of the inventive concept.

Referring to FIG. 7B, a sensing area 200A and a non-sensing area 200N may be defined on the input sensor 200. The sensing area 200A may be an area that is activated according to an electrical signal. For example, the sensing area 200A may be an area that senses an input. The sensing area 200A may overlap the active area AA1 (see FIG. 1) of the electronic device 1000 (see FIG. 1). The non-sensing area 200N may surround the sensing area 200A. The non-sensing area 200N may overlap the peripheral area NAA1 (see FIG. 1) of the electronic device 1000 (see FIG. 1).

The input sensor 200 may include a plurality of transmission electrodes TE and a plurality of reception electrodes RE. Each of the plurality of transmission electrodes TE may extend in the first direction DR1, and the plurality of transmission electrodes TE may be arranged to be spaced apart from each other in the second direction DR2. Each of the plurality of reception electrodes RE may extend in the second direction DR2, and the plurality of reception electrodes RE may be arranged to be spaced apart from each other in the first direction DR1.

The plurality of reception electrodes RE may insulately cross the plurality of transmission electrodes TE. In the present disclosure, the term "insulately cross" refers to elements overlapping or crossing each other when viewed in a particular view or direction (e.g., a plan view or a view perpendicular or normal with respect to a plane (e.g., a display surface or primary display surface), without being electrically connected to each other, such that the elements that cross or overlap each other are insulated from each other. Each of the plurality of transmission electrodes TE and the plurality of reception electrodes RE may have a bar shape or a stripe shape. When each of the plurality of transmission electrodes TE and the plurality of reception electrodes RE has the bar or stripe shape, sensing characteristics of a continuous linear input provided through the input device 2000 may be improved. However, the shape of each of the plurality of transmission electrodes TE and the plurality of reception electrodes RE is not limited to the bar or stripe shape.

The sensor controller 200C may receive the control signal I-CS from the main controller 1000C (see FIG. 3) and provide the coordinate signal I-SS to the main controller 1000C (see FIG. 3).

The sensor controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip, or some and others of the sensor control circuit 200C1, the signal generation circuit 200C2, and the input detection circuit 200C3 may be implemented in different chips.

The sensor control circuit 200C1 may control operations of the signal generation circuit 200C2 and the switching circuit 200C4, calculate coordinates of an external input from the driving signal received from the input detection circuit 200C3, or analyze information, which is transmitted from the input device 2000 (see FIG. 3), from a modulated signal received from the input detection circuit 200C3. The sensor control circuit 200C1 may define the sensing area 200A of the input sensor 200 into a plurality of areas.

The signal generation circuit 200C2 may provide the transmission signal or the uplink signal ULS to the input sensor 200. The signal generation circuit 200C2 may output the uplink signal ULS to the input sensor 200 in the first mode MD1 and may output the transmission signal to the input sensor 200 in the second mode MD2.

The input detection circuit 200C3 may receive the reception signal or the downlink signal DLS from the input sensor 200. The input detection circuit 200C3 may filter the received signal or the downlink signal DLS, or convert the signal into a signal that is capable of being processed by the sensor control circuit 200C1 to provide the converted signal to the sensor control circuit 200C1.

The switching circuit 200C4 may selectively control an electrical connection relationship between the input sensor 200 and the signal generation circuit 200C2 and/or the input detection circuit 200C3 under the control of the sensor control circuit 200C1. The switching circuit 200C4 may connect any one group of the plurality of transmission electrodes TE and the plurality of reception electrodes RE to the signal generation circuit 200C2 according to the control of the sensor control circuit 200C1 or connect each of the plurality of transmission electrodes TE and the plurality of reception electrodes RE to the signal generation circuit 200C2. Alternatively, the switching circuit 200C4 may connect one group or all of the plurality of transmission electrodes TE and the plurality of reception electrodes RE to the input detection circuit 200C3.

Figure 8:
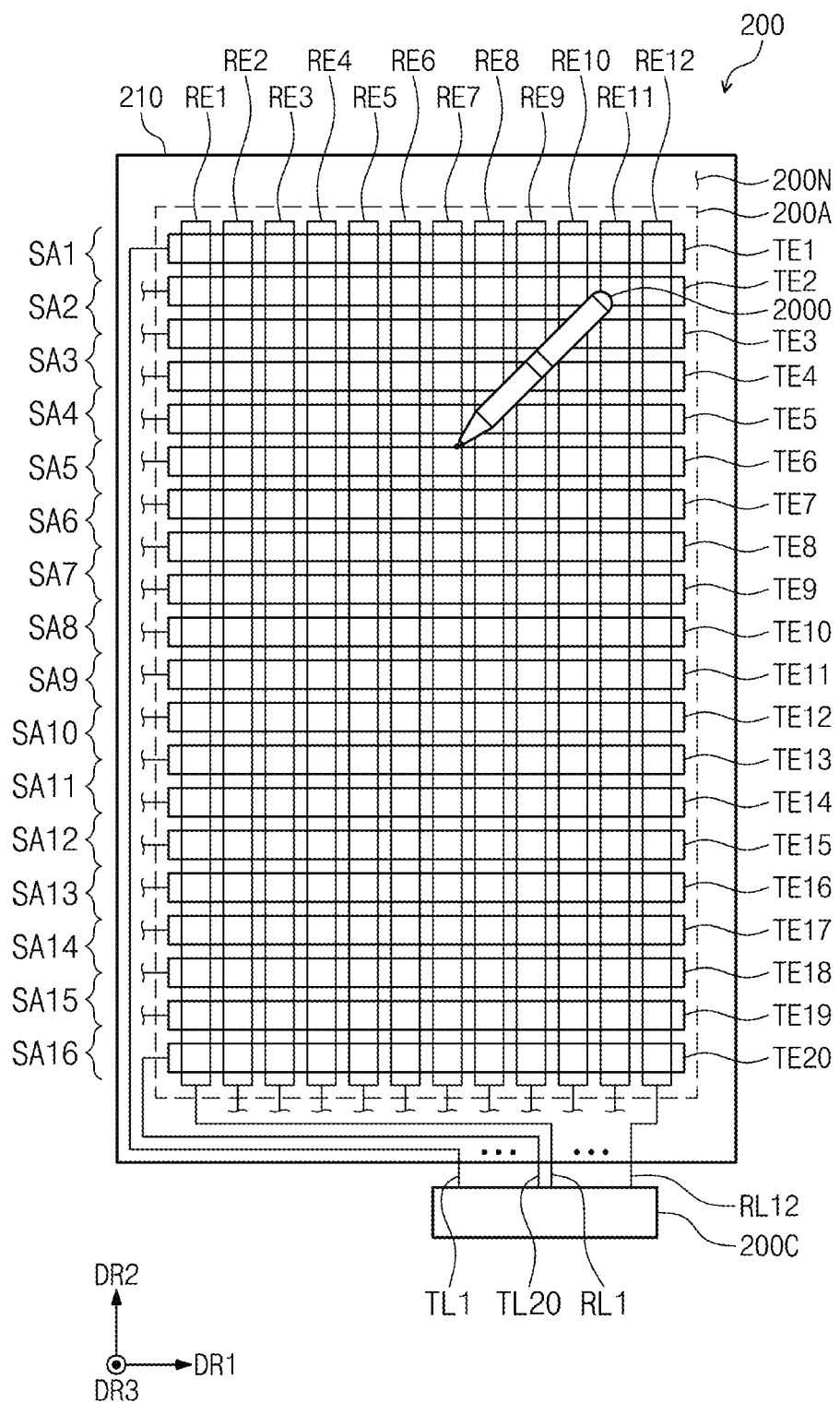
FIG. 8 is a plan view of an input sensor according to some embodiments of the inventive concept.

FIG. 8 is a plan view of the input sensor according to some embodiments of the inventive concept.

Referring to FIG. 8, the input sensor 200 includes a base insulating layer 210, a plurality of transmission electrodes TE1 to TE20, a plurality of reception electrodes RE1 to RE12, a plurality of transmission lines TL1 to TL20, and a plurality of reception lines RL1 to RL12.

The plurality of transmission electrodes TE1 to TE20 and the plurality of reception electrodes RE1 to RE12 may be located on the sensing area 200A. The plurality of transmission electrodes TE1 to TE20 extend in the first direction DR1 and are arranged to be spaced apart from each other in the second direction DR2. The plurality of transmission electrodes TE1 to TE20 may extend along the scan lines SL1 to SLn illustrated in FIG. 6. Each of the plurality of transmission electrodes TE1 to TE20 may have a bar or stripe shape. The plurality of reception electrodes RE1 to RE12 extend in the second direction DR2 and are arranged to be spaced apart from each other in the first direction DR1. Each of the plurality of reception electrodes RE1 to RE12 may have the bar or stripe shape. In FIG. 8, according to some embodiments of the inventive concept, a structure in which 20 transmission electrodes TE1 to TE20 and 12 reception electrodes RE1 to RE12 are located on the sensing area 200A is illustrated, but the number of transmission electrodes TE1 to TE20 and the number of reception electrodes RE1 to RE12 are not particularly limited.

The plurality of transmission lines TL1 to TL20 and plurality of reception lines RL1 to RL12 may be located on the non-sensing area 200N. Each of the plurality of transmission electrodes TE1 to TE20 may be electrically connected to the corresponding line of the plurality of transmission lines TL1 to TL20. Each of the plurality of reception electrodes RE1 to RE12 may be electrically connected to the corresponding line of the plurality of reception lines RL1 to RL12. For example, FIG. 8 illustrates a single routing structure in which one transmission line is connected to each of the transmission electrodes TE1 to TE20, and one reception line is connected to each of the reception electrodes RE1 to RE12, but embodiments are not specifically limited thereto. For example, a pair of reception lines may be connected to both ends of each of the plurality of reception electrodes RE1 to RE12, respectively. Alternatively, a pair of transmission lines may be connected to both ends of each of the plurality of transmission electrodes TE1 to TE20, or a pair of reception lines may be connected to both ends of each of the plurality of reception electrodes RE1 to RE12.

The plurality of transmission lines TL1 to TL20 and the plurality of reception lines RL1 to RL12 may be electrically connected to the sensor controller 200C. The plurality of transmission electrodes TE1 to TE20 may be electrically connected to the sensor controller 200C through the plurality of transmission lines TL1 to TL20, and the plurality of reception electrodes RE1 to RE12 may be electrically connected to the sensor controller 200C through the plurality of reception lines RL1 to RL12.

The sensor controller 200C may provide the uplink signal ULS to the plurality of transmission electrodes TE1 to TE20. When the input device 2000 is located at a first position of the input sensor 200, the sensor controller 200C may receive the downlink signal DLS (see FIG. 3) from the input device 2000 to sense the input device 2000.

Figure 9B:
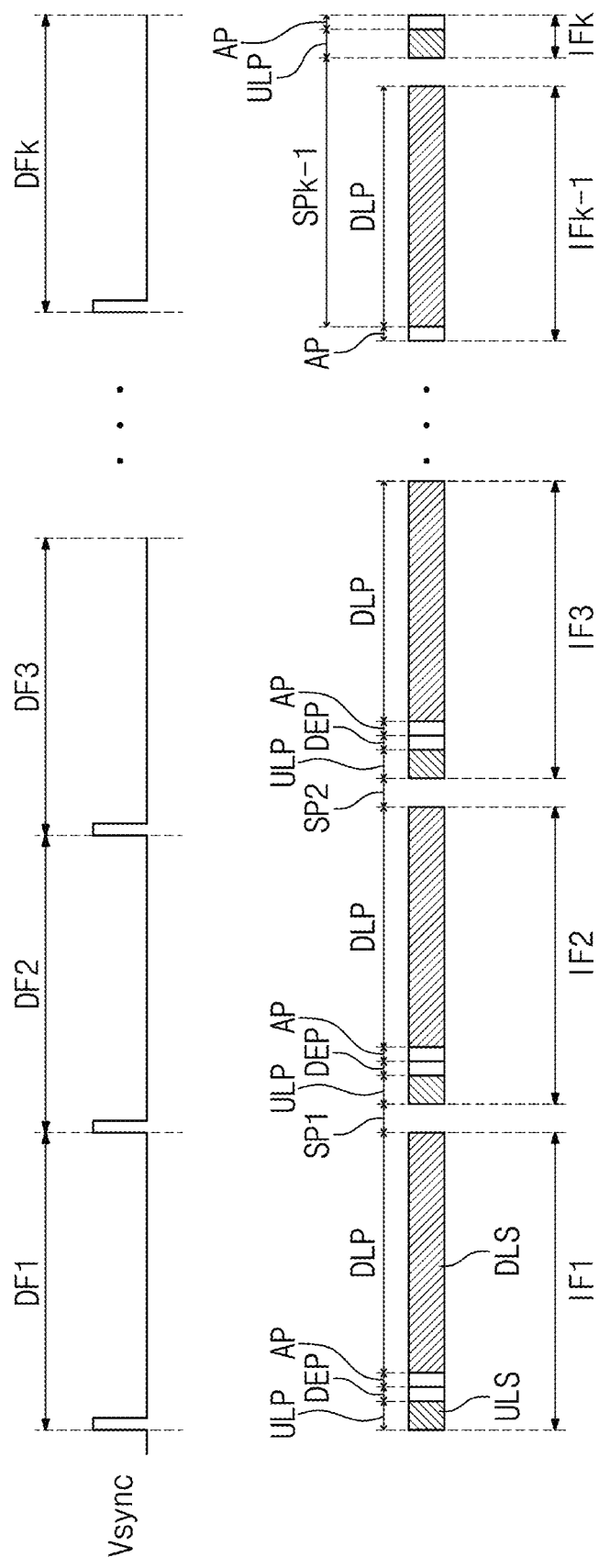

FIGS. 9A and 9B are waveform diagrams for explaining an operation in the first mode of the sensor controller according to some embodiments of the inventive concept.

Referring to FIGS. 3 and 9A, the electronic device 1000 displays an image through the display panel 100. A unit of a time for which the display panel 100 displays the image may be referred to as a display frame. When an operation frequency of the display panel 100 is about 60 Hz, 60 display frames DF1 to DFk may be provided for one second, and a time corresponding to each of the display frames DF1 to DFk may be approximately 16.67 milliseconds (ms). When the operation frequency of the display panel 100 is about 120 Hz, 120 display frames DF1 to DFk may be provided for one second, and a time corresponding to each of the display frames DF1 to DFk may be approximately 8.3 ms. The operation frequency of the display panel 100 may be determined by a vertical synchronization signal Vsync.

The sensor controller 200C may sense the first input during the plurality of input sensing frames IF1 to IFk in the first mode MD1. Each of the input sensing frame IF1 to IFk may include an uplink period ULP for which the uplink signal ULS is transmitted to the input sensor 200 and a downlink period DLP for which the downlink signal DLS is received from the input device 2000. At least a portion IFk of the plurality of input sensing frames IF1 to IFk may not include the downlink period DLP.

At least a portion of the input sensing frames IF1 to IFk may further include a response period AP between the uplink period ULP and the downlink period DLP. During the response period AP, the sensor controller 200C may receive a response signal from the input device 2000 through the input sensor 200. A delay period DEP may be further located between the uplink period ULP and the response period AP.

The k-th input sensing frame IFk may include only the uplink period ULP and the response period AP. Alternatively, the k-th input sensing frame IFk may include the uplink period ULP, the response period AP, and the downlink period DLP. A time width of the downlink period DLP of the kth input sensing frame IFk may be less than that of each of the downlink periods DLP of the other input sensing frames IF1 to IF3.

At least a portion IF1 to IF3 of the input sensing frames IF1 to IFk may further include a pause period PP following the downlink period DLP. During the pause period PP, the sensor controller 200C and the input device 2000 may not perform data communication with each other. The pause period PP may be omitted in a portion of the input sensing frames IF1 to IFk (e.g., the k-th input sensing frame IFk), and a time width of the pause period PP may be different for each of the input sensing frames IF1 to IF3.

FIG. 9A illustrates a structure in which one downlink period DLP is provided in the input sensing frames IF1 to IF3, but the embodiments of the inventive concept are not limited thereto. For example, each of the input sensing frames IF1 to IF3 may include one or more (for example, two or three) downlink periods DLP.

A start time point of the input sensing frames IF2 to IFk among the plurality of input sensing frames IF1 to IFk may be different from a start time point of each of the corresponding display frames DF2 to DFk. The start time point of the input sensing frames IF2 to IFk may be shifted or delayed from the start time point of each of the corresponding display frames DF2 to DFk. A time width between the start time point of each of the input sensing frames IF1 to IFk and the start time point of each of the corresponding display frames DF1 to DFk may vary in a unit of one input sensing frame.

The j-th input sensing frame of the k input sensing frames IF1 to IFk may be shifted or delayed by j-1 times the preset shift period (i.e., the first shift period SP1) from the start time point of the corresponding display frame. Here, j is an integer equal to or less than k.

For example, the start time point of the first input sensing frame IF1 may be the same as the start time point of the corresponding first display frame DF1. On the other hand, the start time point of the second input sensing frame IF2 may be shifted or delayed by a first shift period SP1 from the start time point of the corresponding second display frame DF2. Also, the start time point of the third input sensing frame IF3 may be shifted or delayed by a second shift period SP2 from the start time point of the corresponding third display frame DF3. Here, a time width of the second shift period SP2 may be greater than that of the first shift period SP1. As an example of the inventive concept, the second shift period SP2 may have a time width corresponding to twice the time width of the first shift period SP1. The start time point of the k-th input sensing frame IFk may be shifted or delayed by the (k−1)-th shift period SPk−1 from the start time point of the corresponding k-th display frame DFk. Here, the (k−1)-th shift period SPk−1 may have a time width corresponding to k−1 times the time width of the first shift period SP1.

As an example of the inventive concept, the sensor controller 200C may repeatedly perform the above-described shift operation in units of k input sensing frames. That is, the start time point of the (k+1)-th input sensing frame may be the same as the start time point of the corresponding (k+1)-th display frame, and the start time point of the (k+2)-th input sensing frame may be shifted or delayed by the first shift period SP1 from the start time point of the corresponding (k+2)-th display frame. As an example of the inventive concept, the first shift period SP1 may have a time width less than or equal to the time width of the uplink period ULP. Here, k may be an integer equal to or greater than 2.

As an example of the inventive concept, the display panel 100 may operate at a driving frequency of about 60 Hz, the uplink period ULP may have a time width of about 1 ms, and the shift operation may be repeated in units of 16 input sensing frames. In this case, the first shift period SP1 may have a time width of about 1 ms, like the uplink period ULP.

Each of the input sensing frames IF1 to IFk may not overlap the next display frames DF2 to DFk. For example, the first input sensing frame IF1 may not overlap the second display frame DF2, and the second input sensing frame IF2 may not overlap the third display frame DF3. Alternatively, each of the input sensing frames IF1 to IFk may overlap the next display frames DF2 to DFk.

Referring to FIGS. 3 and 9B, some IF1 to IF3 and IFk−1 of the input sensing frames IF1 to IFk may include the uplink period ULP and the downlink period DLP. Here, the downlink period DLP of some IF2, IF3, and IFk−1 of the input sensing frames IF1 to IFk may overlap the next display frame. For example, the downlink period DLP of the second input sensing frame IF2 overlaps the third display frame DF3, and the downlink period DLP of the third input sensing frame IF3 may overlap the fourth display frame. Also, the downlink period DLP of the (k−1)-th input sensing frame IFk−1 may overlap the k-th display frame DFk.

As illustrated in FIG. 9B, although the time width of the downlink period DLP increases compared to that of FIG. 9A, as the downlink period DLP overlaps the next display frame, the downlink period DLP may be sufficiently secured even though the downlink period DLP is shifted or delayed. In FIG. 9B, the time widths of the input sensing frames IF1 to IFk−1 may be the same.

Figure 10A:
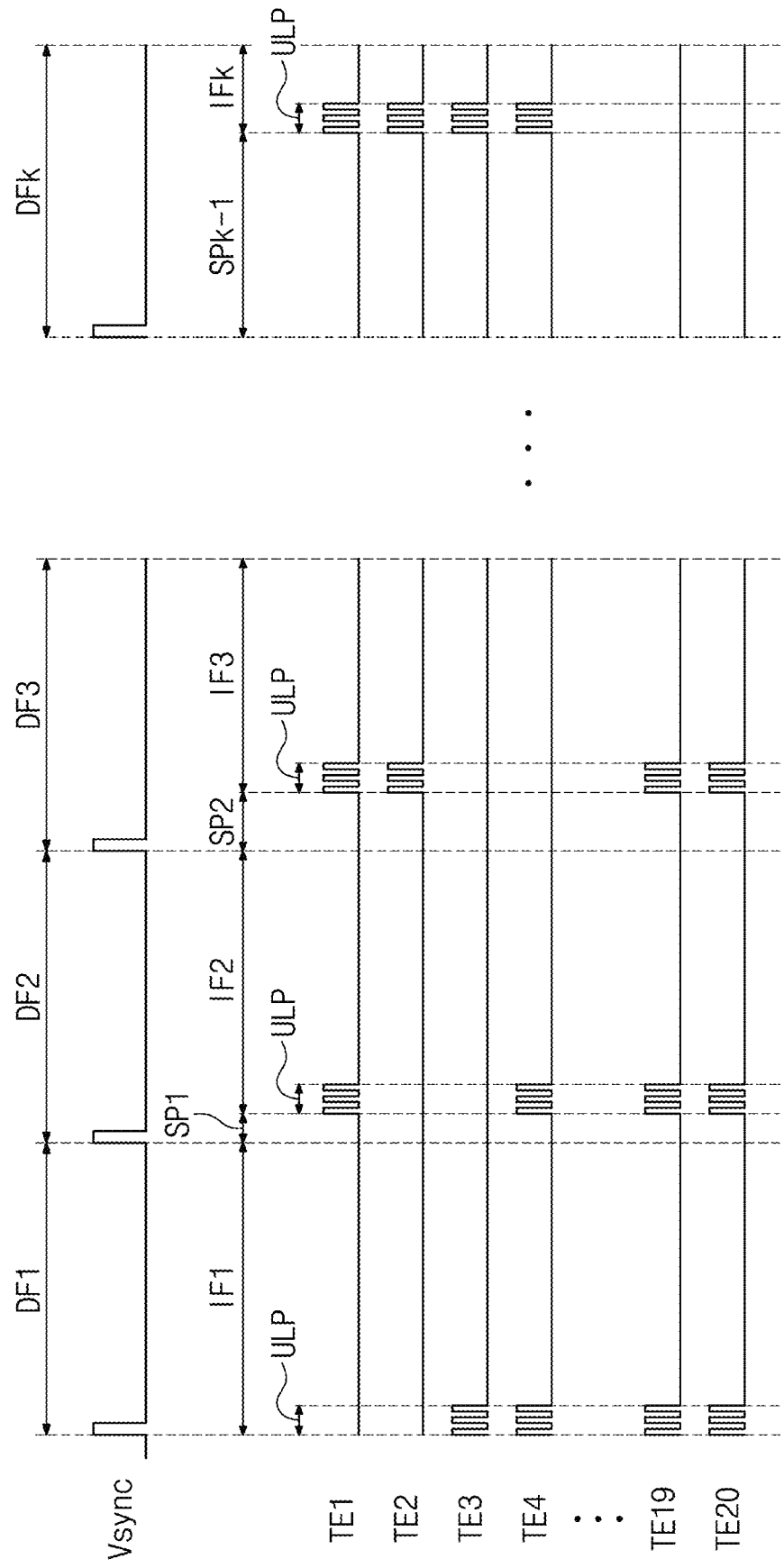
FIGS. 10A and 10B are waveform diagrams of uplink signals applied to transmission electrodes in uplink sections of input sensing frames according to some embodiments of the inventive concept.
Figure 10B:
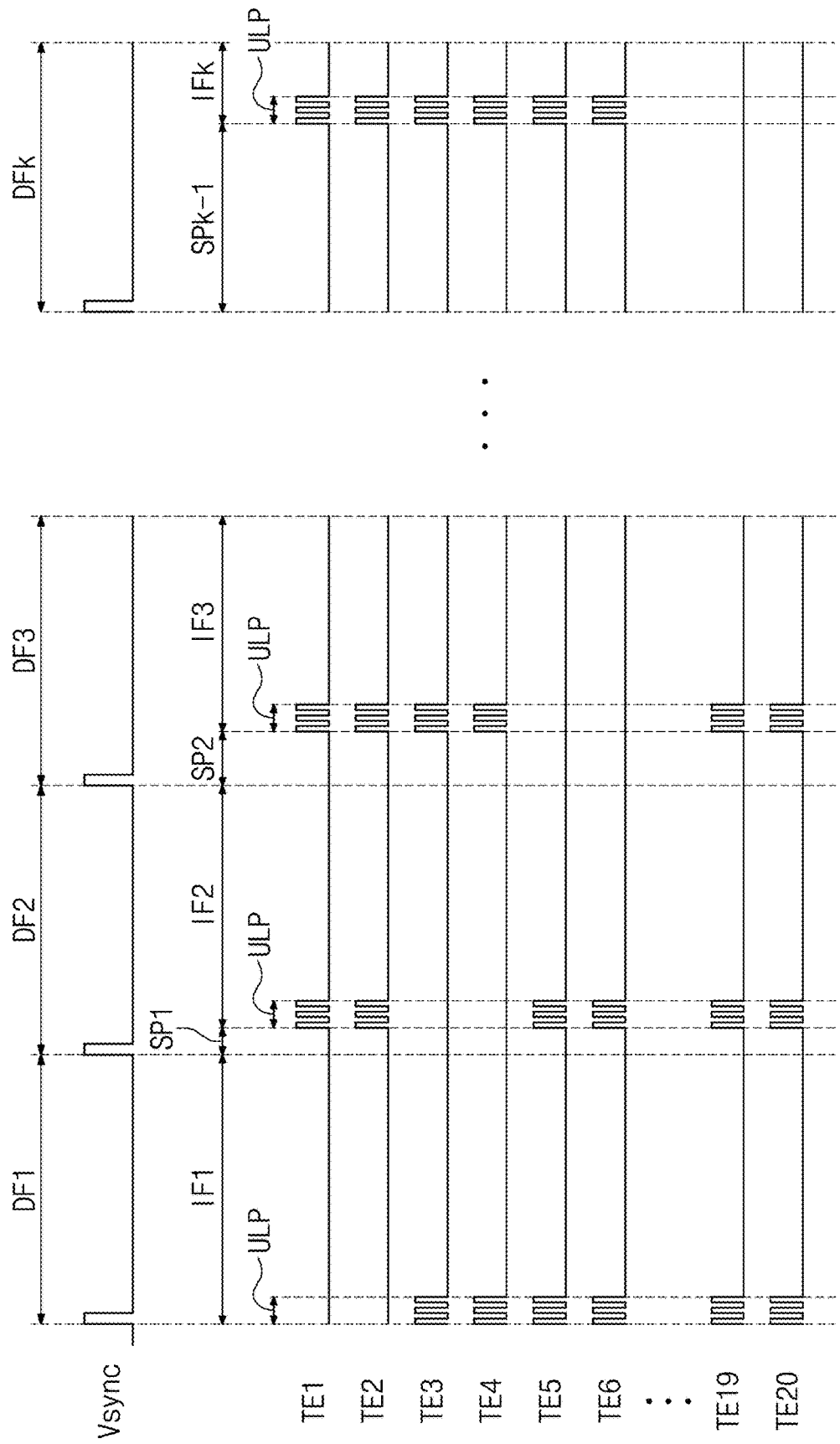
Figure 11A:
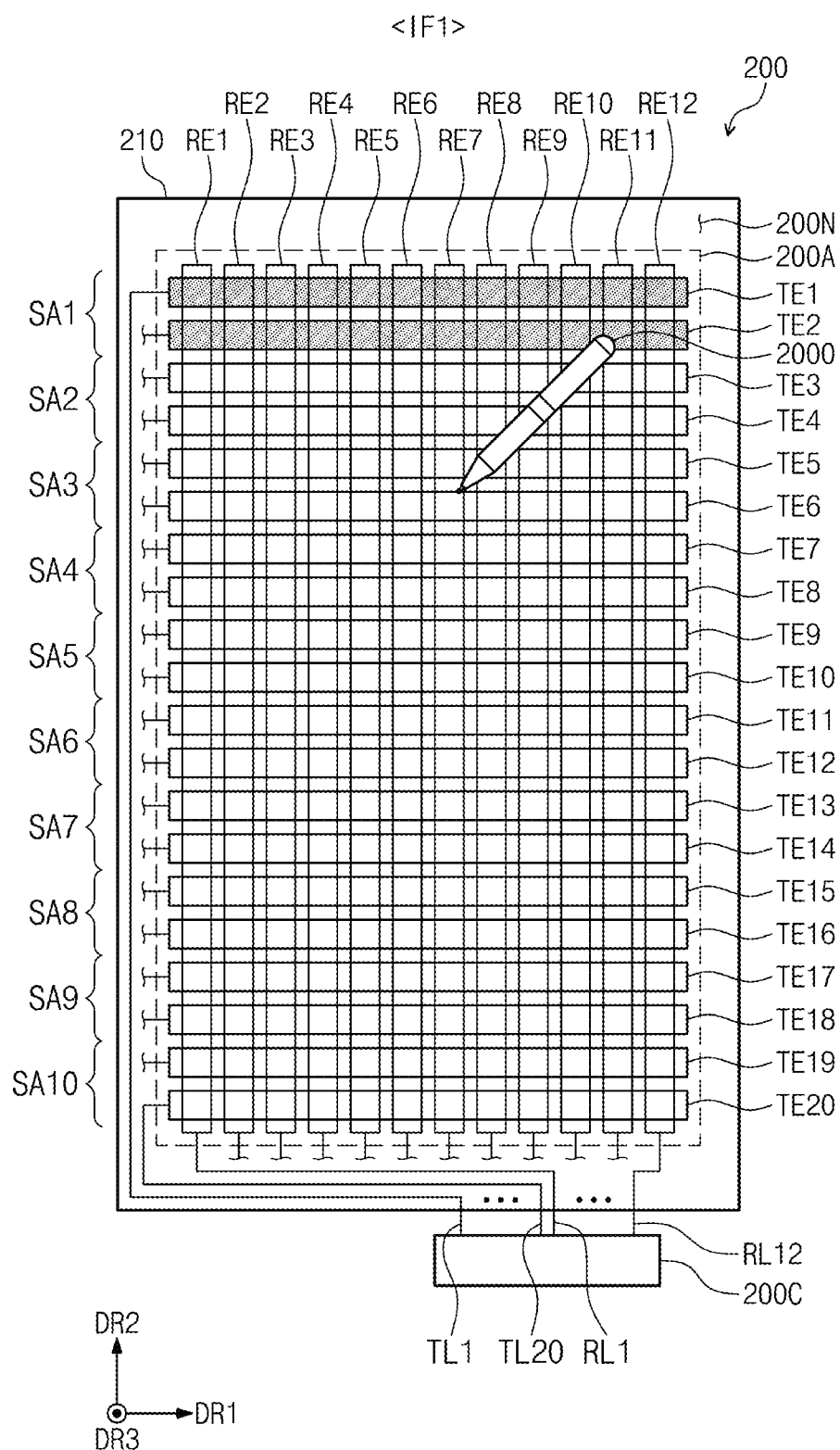
FIGS. 11A to 11D are plan views for explaining a shift operation of the sensor controller according to some embodiments of the inventive concept.
Figure 11B:
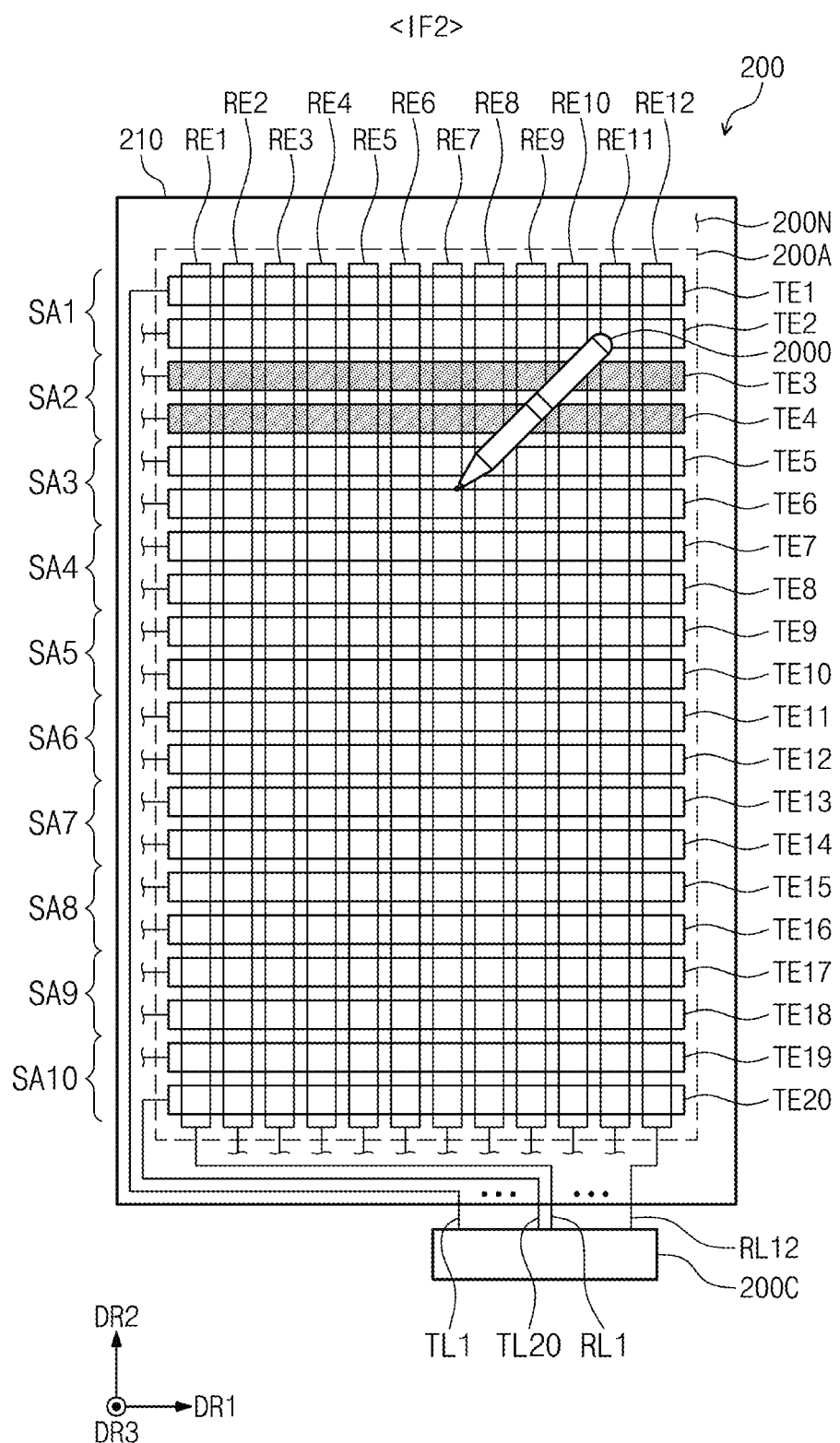
Figure 11C:
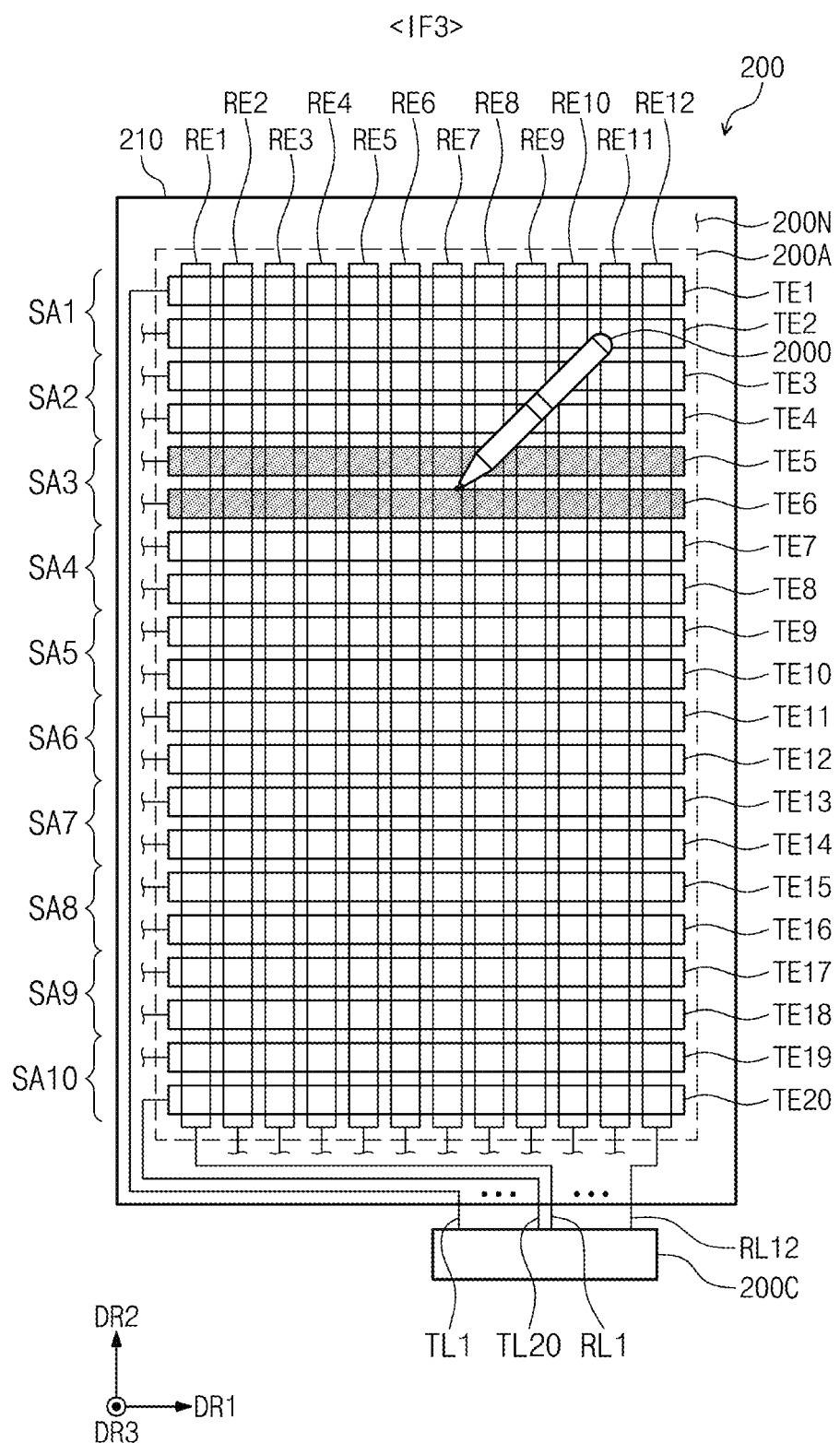
Figure 11D:
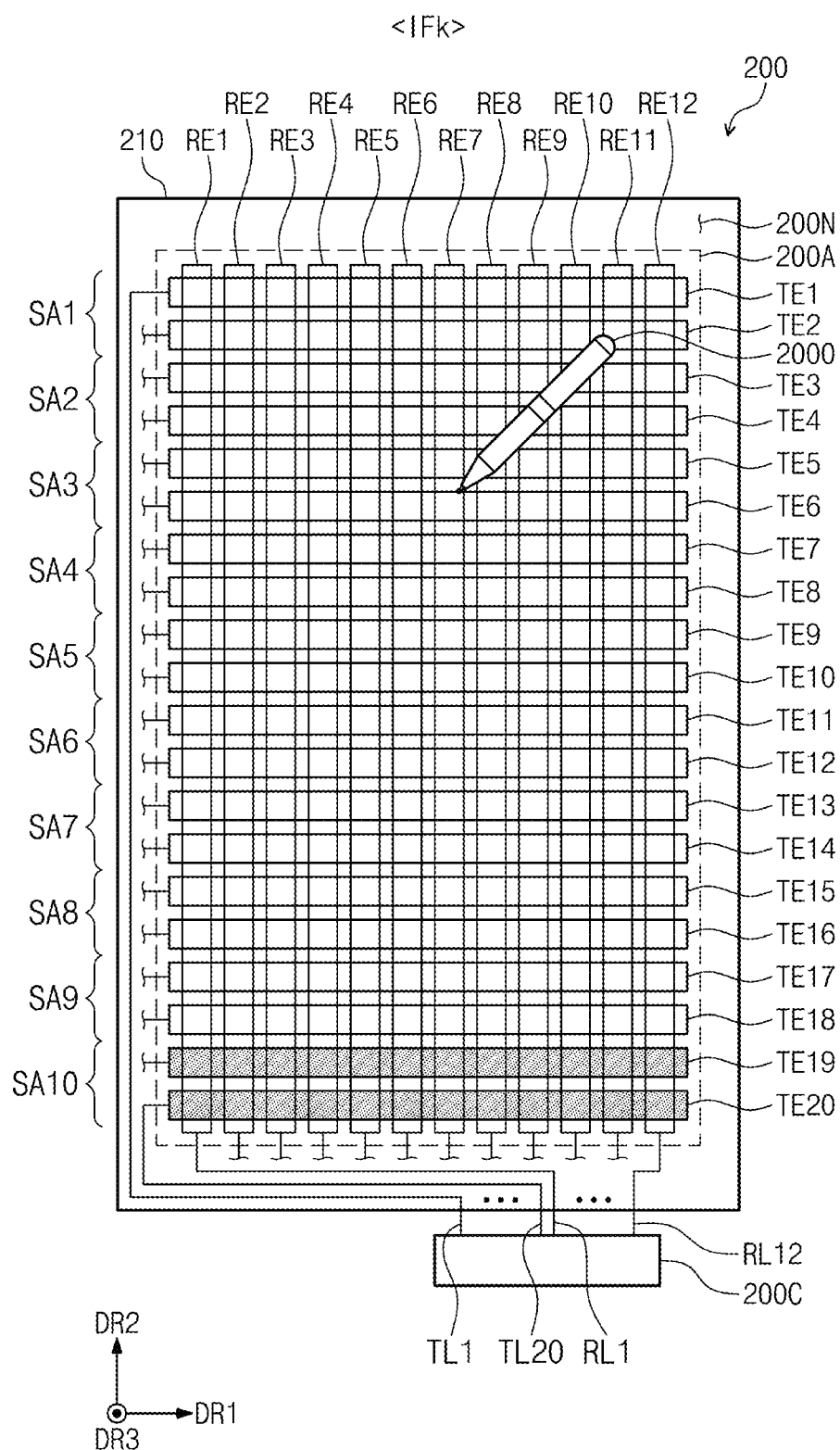

FIGS. 10A and 10B are waveform diagrams of the uplink signals applied to the transmission electrodes for the uplink periods of the input sensing frames. FIGS. 11A to 11D are plan views for explaining a shift operation of the sensor controller according to some embodiments of the inventive concept.

Referring to FIGS. 8, 9A, and 10A, the sensing area 200A in which the transmission electrodes TE1 to TE20 are located may be divided into k areas. Each of areas may overlap at least one or more transmission electrodes. During each of the input sensing frames IF1 to IFk, the uplink signal ULS may not be supplied to the transmission electrode corresponding to at least one of k areas.

According to some embodiments of the inventive concept, in the sensing region 200A, 20 transmission electrodes TE1 to TE20 may be arranged along the second direction DR2, and the sensing area 200A may be divided into 16 areas SA1 to SA16. Each of the areas SA1 to SA16 may overlap at least two transmission electrodes.

During the first input sensing frame IF1, the sensor controller 200C may not supply the uplink signal ULS to the transmission electrodes TE1 and TE2 corresponding to the first area SA1 of the 16 areas SA1 to SA16, but supply the uplink signal ULS to the transmission electrodes TE3 to TE20 corresponding to the second to sixteenth areas SA2 to SA16. That is, during the uplink period ULP of the first input sensing frame IF1, the first and second transmission electrodes TE1 and TE2 overlapping the first area SA1 may be maintained in a blank state without receiving the uplink signal ULS. Here, the uplink period ULP of the first input sensing frame IF1 may overlap a period in which scan lines corresponding to the first area SA1 among the scan lines SL1 to SLn (see FIG. 6) located on the display panel 100 receive the scan signal. Although the uplink signal ULS is applied to the third to twentieth transmission electrodes TE3 to TE20 during the uplink period ULP, the scan lines located on the display panel 100 to correspond to the second to sixteenth areas SA2 and SA16 may not receive the scan signal during the uplink period ULP. Thus, the uplink signal ULS applied to the third to twentieth transmission electrodes TE3 to TE20 in the first input sensing frame IF1 may not overlap the scan signal applied to the scan lines spatially corresponding to the third to twentieth transmission electrodes TE3 to TE20. Therefore, an area on which the uplink signal ULS and the scan signal overlap each other in the sensing area 200A may not exist. As a result, a phenomenon in which a flicker is visually recognized or perceived by viewers may be removed or reduced in the electronic device 1000 by an interference of the uplink signal ULS.

During the second input sensing frame IF2, the sensor controller 200C may not supply the uplink signal ULS to the second and third transmission electrodes TE2 and TE3 corresponding to the second area SA2 of the 16 areas SA1 to SA16, but supply the uplink signal ULS to the transmission electrodes TE1 and TE4 to TE16 corresponding to the first and third to sixteenth areas SA1 and SA3 to SA16. That is, the second and third transmission electrodes TE2 and TE3 overlapping the second area SA2 may be maintained in a blank state without receiving the uplink signal ULS. Here, the uplink period ULP of the second input sensing frame IF2 may overlap a period in which the scan lines located on the display panel 100 to correspond to the second area SA2 receive the scan signal. Although the uplink signal ULS is applied to the first and fourth to twentieth transmission electrodes TE1 and TE4 to TE20 during the uplink period ULP, the scan lines located on the display panel 100 to correspond to the first and third to sixteenth areas SA1 and SA3 to SA16 may not receive the scan signal during the uplink period ULP. Thus, the uplink signal ULS may not occur by overlapping the scan signal applied to the scan lines spatially corresponding to the first and fourth to twentieth transmission electrodes TE1 and TE4 to TE20 in the second input sensing frame IF2.

During the third input sensing frame IF3, the third and fourth transmission electrodes TE3 and TE4 corresponding to the third area SA3 may be maintained in a blank state without receiving the uplink signal ULS. Here, the uplink period ULP of the third input sensing frame IF3 may overlap a period in which the scan lines located on the display panel 100 to correspond to the third area SA3 receive the scan signal.

In the case in which k is 16, for the k-th input sensing frame IFk, the nineteenth and twentieth transmission electrodes TE19 and TE20 corresponding to the sixteenth area SA16 may be maintained in a blank state without receiving the uplink signal ULS. Here, the uplink period ULP of the k-th input sensing frame IFk may overlap a period in which the scan lines located on the display panel 100 to correspond to the sixteenth area SA16 receive the scan signal.

As described above, the uplink signal ULS may not occur by overlapping the scan signal in each of the input sensing frames IF1 to IFk. Thus, an area on which the uplink signal ULS overlaps the scan signal from the sensing area 200A may be removed to remove or reduce the phenomenon in which the flicker is visually recognized on an image of the electronic device 1000. Also, the transmission electrodes maintained in the blank state are shifted in a scan direction (i.e., the second direction DR2) for each of the input sensing frames IF1 to IFk in each of the input sensing frames IF1 to IFk. Thus, some embodiments may prevent or reduce instances of a phenomenon in which the uplink signal ULS is not applied to a specific transmission electrode of the transmission electrodes TE1 to TE20 for several frames occurring. Thus, the situation in which the input device 2000 is not sensed at a specific position of the sensing area 200A may be resolved.

Referring to FIGS. 10B and 11A to 11D, in the sensing area 200A, 20 transmission electrodes TE1 to TE20 may be arranged along the second direction DR2, and the sensing area 200A may be divided into 10 areas SA1 to SA10. Each of the areas SA1 to SA10 may overlap two transmission electrodes.

As an example, according some embodiments of the inventive concept, the first area SA1 may overlap the first and second transmission electrodes TE1 and TE2, the second area SA2 may overlap the third and fourth transmission electrodes TE3 and TE4, and the third area SA3 may overlap the fifth and sixth transmission electrodes TE5 and TE6. The tenth area SA10 may overlap the nineteenth and twentieth transmission electrodes TE19 and TE20.

During the first input sensing frame IF1, the first and second transmission electrodes TE1 and TE2 corresponding to the first area SA1 may be maintained in the blank state without receiving the uplink signal ULS from the sensor controller 200C. Here, the uplink period ULP of the first input sensing frame IF1 may overlap a period in which the scan lines located on the display panel 100 to correspond to the first area SA1 receive the scan signal. Although the uplink signal ULS is applied to the third to twentieth transmission electrodes TE3 to TE20 during the uplink period ULP, the scan lines located on the display panel 100 to correspond to the second to tenth areas SA2 and SA10 may not receive the scan signal during the uplink period ULP. Thus, the uplink signal ULS may not occur by overlapping the scan signal in the first input sensing frame IF1. Therefore, an area on which the uplink signal ULS and the scan signal overlap each other in the sensing area 200A may not exist. As a result, the phenomenon in which the flicker is visually recognized on an image of the electronic device 1000 may be removed or reduced by an interference of the uplink signal ULS.

During the second input sensing frame IF2, the third and fourth transmission electrodes TE3 and TE4 corresponding to the second area SA2 may be maintained in the blank state without receiving the uplink signal ULS from the sensor controller 200C. Here, the uplink period ULP of the second input sensing frame IF2 may overlap a period in which the scan lines located on the display panel 100 to correspond to the second area SA2 receive the scan signal. Although the uplink signal ULS is applied to the first, second, and fifth to twentieth transmission electrodes TE1, TE2, and TE5 to TE20 during the uplink period ULP, the scan lines located on the display panel 100 to correspond to the first and third to tenth areas SA1 and SA3 to SA10 may not receive the scan signal during the uplink period ULP. Thus, the uplink signal ULS may not occur by overlapping the scan signal in the second input sensing frame IF2.

During the third input sensing frame IF3, the fifth and sixth transmission electrodes TE5 and TE6 corresponding to the third area SA3 may be maintained in the blank state without receiving the uplink signal ULS from the sensor controller 200C. Here, the uplink period ULP of the third input sensing frame IF3 may overlap a period in which the scan lines located on the display panel 100 to correspond to the third area SA3 receive the scan signal.

In the case in which k is 10, for the k-th input sensing frame IFk, the nineteenth and twentieth transmission electrodes TE19 and TE20 corresponding to the tenth area SA10 may be maintained in the blank state without receiving the uplink signal ULS. Here, the uplink period ULP of the k-th input sensing frame IFk may overlap a period in which the scan lines located on the display panel 100 to correspond to the tenth area SA10 receive the scan signal.

As described above, the uplink signal ULS may not occur by overlapping the scan signal in each of the input sensing frames IF1 to IFk. Thus, an area on which the uplink signal ULS overlaps the scan signal from the sensing area 200A may be removed to remove or reduce the phenomenon in which the flicker is visually recognized on an image of the electronic device 1000. Also, as the transmission electrodes maintained in the blank state within each of the input sensing frames IF1 to IFk are shifted in the scan direction (i.e., the second direction DR2) for each of the input sensing frames IF1 to IFk, the phenomenon in which the uplink signal ULS is not applied for several frames to a specific transmission electrode of the transmission electrodes TE1 to TE20 may be prevented from occurring. Thus, the limitation in which the input device 2000 is not sensed at a specific position of the sensing area 200A may be solved.

In the inventive concept, k may be an integer greater than or equal to 2, and k may have different values according to a size of the display panel 100, the number of scan lines SL1 to SLn (see FIG. 6), the number of transmission electrodes TE1 to TE20, a driving frequency of the display panel 100.

Figure 12:
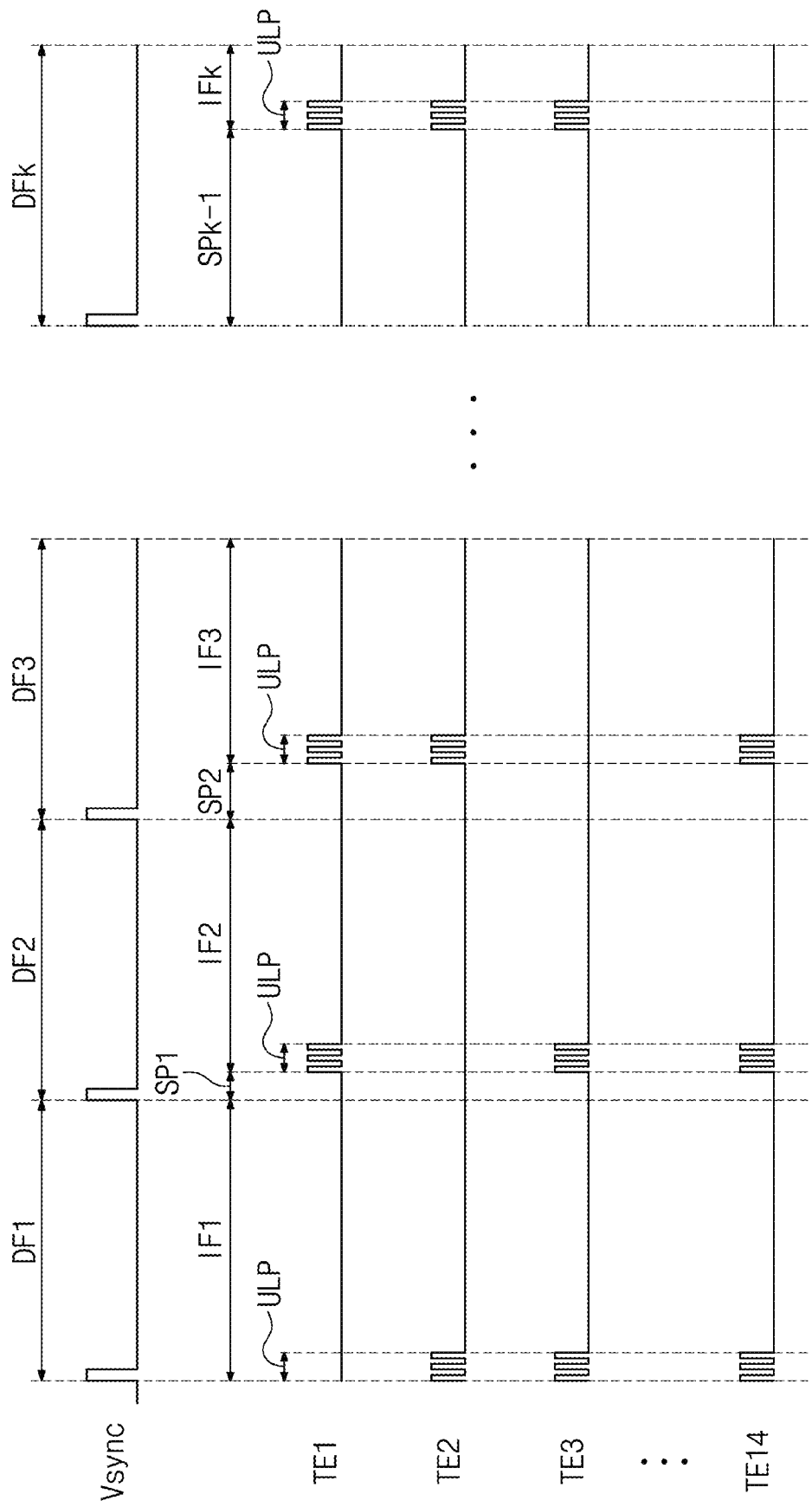
FIG. 12 is a waveform diagram of uplink signals applied to transmission electrodes in uplink sections of input sensing frames according to some embodiments of the inventive concept.
Figure 13A:
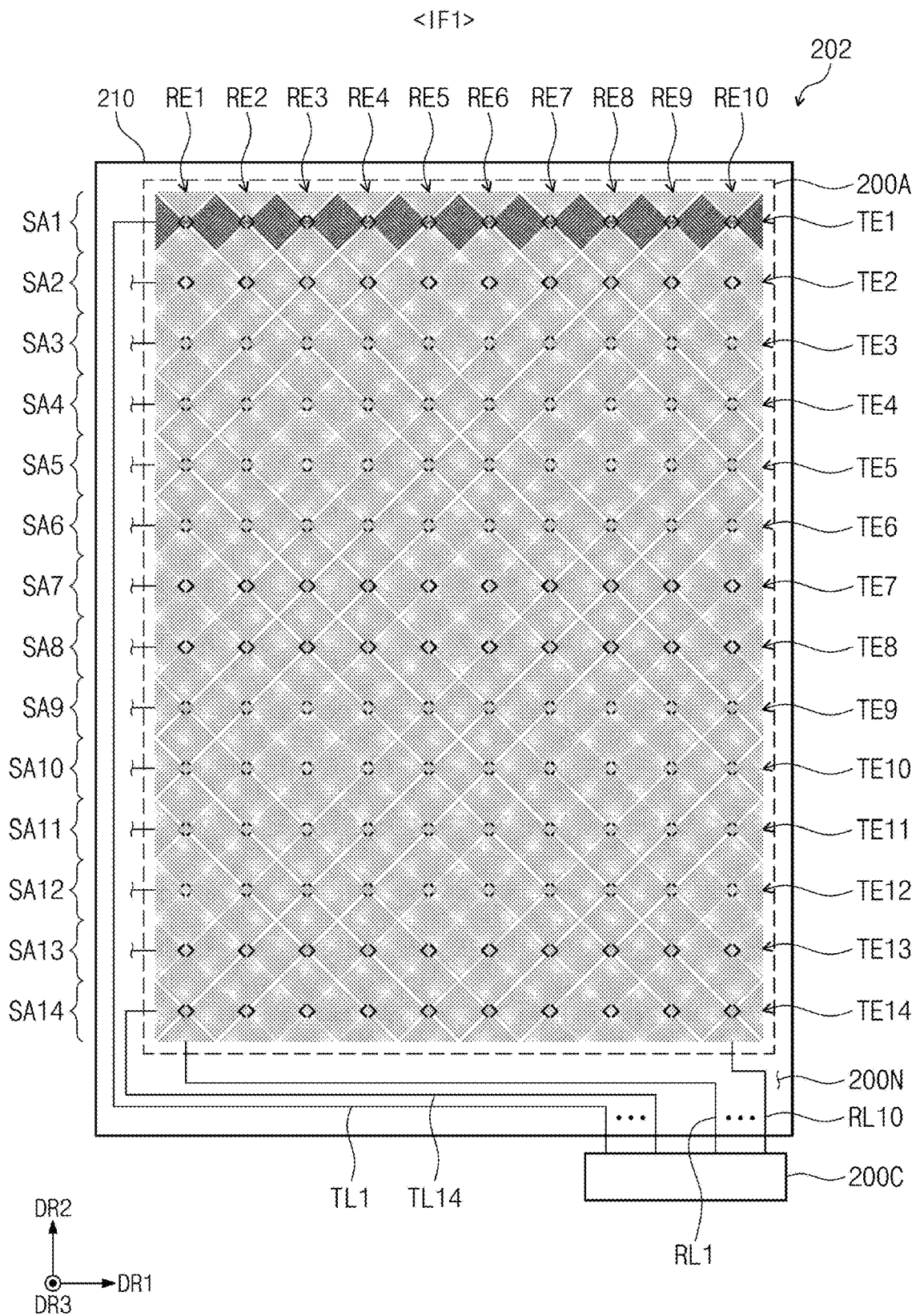
FIGS. 13A to 13D are plan views for explaining a shift operation of a sensor controller according to some embodiments of the inventive concept.
Figure 13B:
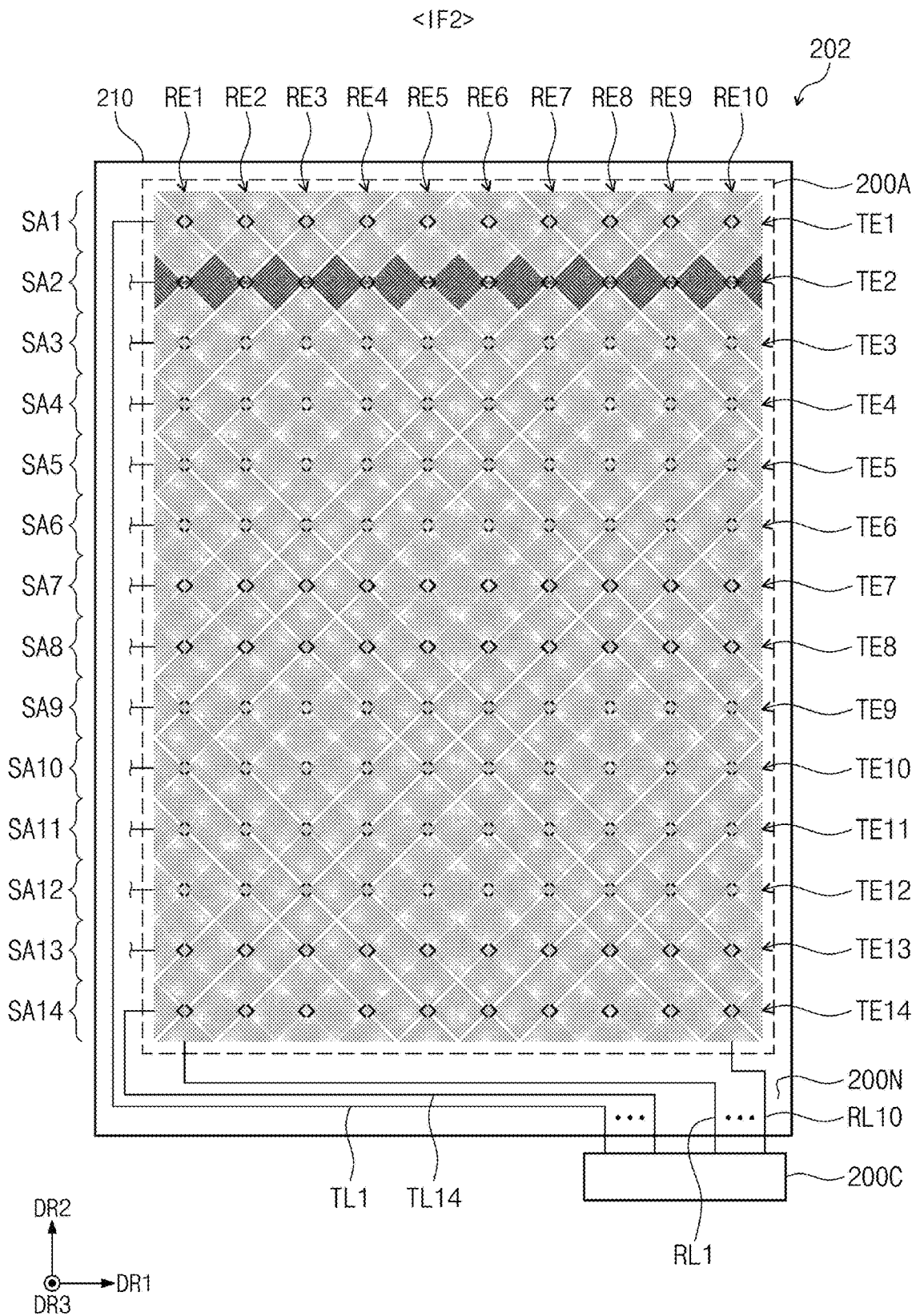
Figure 13C:
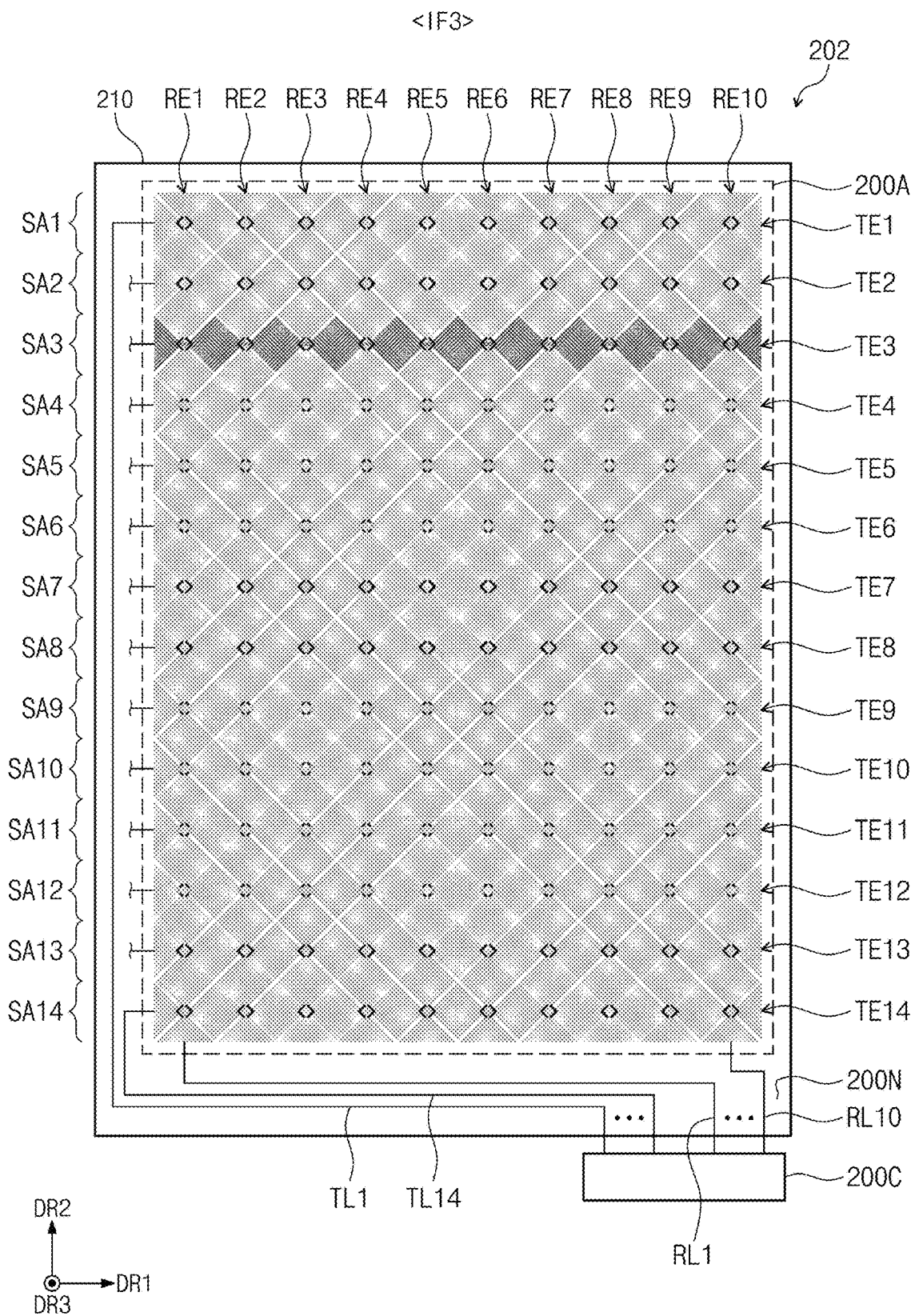
Figure 13D:
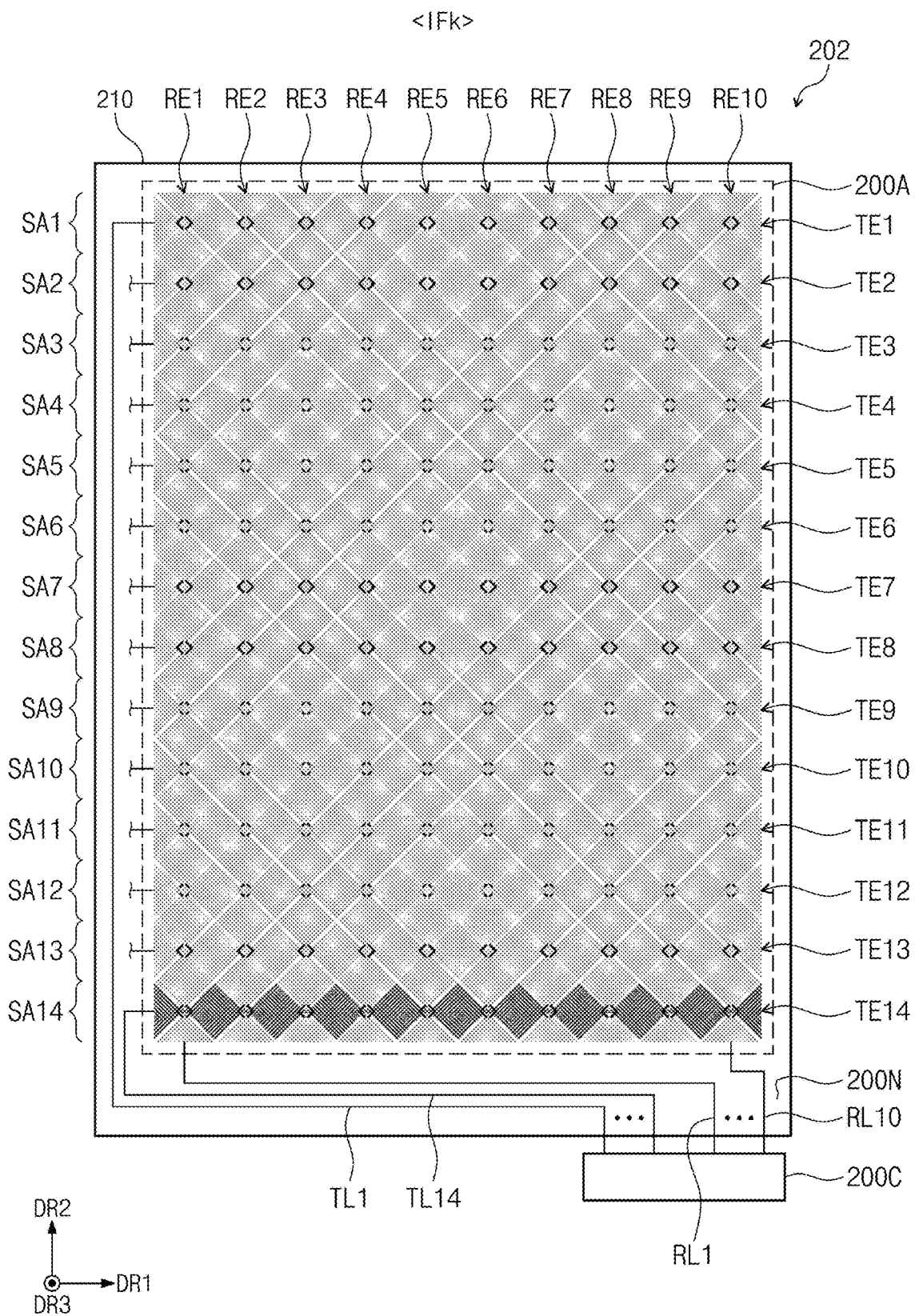

FIG. 12 is a waveform diagram of the uplink signals applied to the transmission electrodes in the uplink periods of the input sensing frames. FIGS. 13A to 13D are plan views for explaining a shift operation of the sensor controller according to some embodiments of the inventive concept.

Referring to FIGS. 12, 13A to 13D, 14 transmission electrodes TE1 to TE14 are arranged along the second direction DR2 on a sensing area 200A of an input sensor 202 according to some embodiments of the inventive concept. The sensing area 200A may be divided into k areas SA1 to SA14. As an example of the inventive concept, k may be equal to the number of transmission electrodes TE1 to TE14 located on the sensing area 200A. That is, when 14 transmission electrodes TE1 to TE14 are located on the sensing area 200A, the sensing area 200A may be divided into 14 areas SA1 to SA14. When the number of transmission electrodes TE1 to TE14 are the same as k, each of the areas SA1 to SA14 may overlap one transmission electrode.

As an example of the inventive concept, the first area SA1 may overlap the first transmission electrode TE1, the second area SA2 may overlap the second transmission electrode TE2, and the third area SA3 may overlap the third transmission electrode TE3. The fourteenth area SA14 may overlap the fourteenth transmission electrode TE14.

During the first input sensing frame IF1, the first transmission electrode TE1 corresponding to the first area SA1 may be maintained in a blank state without receiving the uplink signal ULS from the sensor controller 200C. Here, the uplink period ULP of the first input sensing frame IF1 may overlap a period in which the scan lines located on the display panel 100 to correspond to the first area SA1 receive the scan signal. Although the uplink signal ULS is applied to the second to fourteenth transmission electrodes TE2 to TE14 during the uplink period ULP, the scan lines located on the display panel 100 to correspond to the second to fourteenth area SA2 to SA14 may not receive the scan signal during the uplink period ULP. Thus, the uplink signal ULS may not occur by overlapping the scan signal in the first input sensing frame IF1. Therefore, an area on which the uplink signal ULS and the scan signal overlap each other in the sensing area 200A may not exist. As a result, the phenomenon in which the flicker is visually recognized on an image of the electronic device 1000 (see FIG. 3) may be removed or reduced by an interference of the uplink signal ULS.

During a second input sensing frame IF2, the second transmission electrode TE2 corresponding to the second area SA2 may be maintained in the blank state without receiving the uplink signal ULS from the sensor controller 200C. Here, an uplink period ULP of the second input sensing frame IF2 may overlap a period in which the scan lines located on the display panel 100 to correspond to the second area SA2 receive the scan signal. Although the uplink signal ULS is applied to the first and third to fourteenth transmission electrodes TE1 and TE3 to TE14 during the uplink period ULP, the scan lines located on the display panel 100 to correspond to the first and third to fourteenth areas SA1 and SA3 to SA14 may not receive the scan signal during the uplink period ULP. Thus, the uplink signal ULS may not occur by overlapping the scan signal in the second input sensing frame IF2.

During a third input sensing frame IF3, the third transmission electrode TE3 corresponding to the third area SA3 may be maintained in the blank state without receiving the uplink signal ULS from the sensor controller 200C. Here, the uplink period ULP of the third input sensing frame IF3 may overlap a period in which the scan lines located on the display panel 100 to correspond to the third area SA3 receive the scan signal.

In the case in which k is 14, for the k-th input sensing frame IFk, the fourteenth transmission electrode TE14 corresponding to the fourteenth area SA14 may be maintained in the blank state without receiving the uplink signal ULS. Here, the uplink period ULP of the k-th input sensing frame IFk may overlap a period in which the scan lines located on the display panel 100 to correspond to the fourteenth area SA14 receive the scan signal.

As described above, the uplink signal ULS may not occur by overlapping the scan signal in each of the input sensing frames IF1 to IFk. Thus, an area on which the uplink signal ULS overlaps the scan signal from the sensing area 200A may be removed to remove or reduce the phenomenon in which the flicker is visually recognized on an image of the electronic device 1000. Also, as the transmission electrodes maintained in the blank state within each of the input sensing frames IF1 to IFk are shifted in the scan direction (i.e., the second direction DR2) for each of the input sensing frames IF1 to IFk, the phenomenon in which the uplink signal ULS is not applied for several frames to a specific transmission electrode of the transmission electrodes TE1 to TE14 may be prevented from occurring. Thus, the limitation in which the input device 2000 is not sensed at a specific position of the sensing area 200A may be solved.

As an example of the inventive concept, each of the transmission electrodes TE1 to TE14 and the reception electrodes RE1 to RE10 may include sensor units, each of which has a rhombus shape. The sensor units of each of the transmission electrodes TE1 to TE14 are arranged in the first direction DR1 and are electrically connected to each other. The sensor units of each of the reception electrodes RE1 to RE10 are arranged in the second direction DR2 and are electrically connected to each other.

FIGS. 13A to 13D illustrate an example of the sensor units according to some embodiments, each of which has a rhombus shape, but the shape of each of the sensor units is not particularly limited and may have a different polygonal shape.

Each of the sensor units may have a mesh shape. Because each of the sensor units has the mesh shape, parasitic capacitance with respect to electrodes of the display panel 100 (see FIG. 3) may be reduced.

In the electronic device according to some embodiments of the inventive concept, some of the transmission electrodes of the input sensor may not receive the uplink signal from the sensor controller for the uplink period for which the uplink signal is supplied to the input sensor. The uplink period may overlap the scan period of the scan lines corresponding to some of the transmission electrodes that do not receive the uplink signal. Therefore, when the input is sensed, the area on which the flicker is visually recognized on the image of the electronic device by the uplink signal may be removed or reduced.

It will be apparent to those skilled in the art that various modifications and deviations can be made in the present invention. Thus, it is intended that the present disclosure covers the modifications and deviations of this invention provided they come within the scope of the appended claims and their equivalents. Accordingly, the technical scope of the present invention should not be limited to the contents described in the detailed description of the specification, but should be determined by the claims and their equivalents.

What is claimed is:

1. An electronic device comprising:
    a display panel configured to display an image during a display frame, the display panel comprising a plurality of scan lines sequentially receiving scan signals during the display frame;
    an input sensor comprising transmission electrodes on the display panel and reception electrodes that insulately cross the transmission electrodes; and
    a sensor controller configured to operate in a first mode or a second mode different from the first mode, wherein, in the first mode, the sensor controller is configured to transmit an uplink signal to an input device through the input sensor and to receive a downlink signal from the input device through the input sensor,
    wherein an input sensing frame, in which the sensor controller operates in the first mode, comprises an uplink period for which the uplink signal is provided to the input sensor, and
    the sensor controller is configured to not apply the uplink signal to a first portion of the transmission electrodes corresponding to a spatial location of one or more scan lines, from among the plurality of scan lines, receiving the scan signal during the uplink period and to apply the uplink signal to a second portion of the transmission electrodes not corresponding to the one or more scan lines during the uplink period,
    the uplink period overlaps the scan signals applied to the scan lines spatially corresponding to the first portion of the transmission electrodes.

2. The electronic device of claim 1, wherein the uplink period is shifted or delayed in a unit of one input sensing frame.

3. The electronic device of claim 2, wherein
    a start time point of the uplink period for k input sensing frames is shifted or delayed from a start time point of the display frame in the unit of one input sensing frame, and
    k is an integer equal to or greater than 2.

4. The electronic device of claim 3, wherein a j-th input sensing frame of the k input sensing frames is shifted or delayed by j−1 times a shift period from the start time point of the display frame, and
    j is an integer equal to or less than k.

5. The electronic device of claim 4, wherein the shift period has a width equal to or different from that of the uplink period.

6. The electronic device of claim 3, wherein the input sensor is divided into k areas based on the transmission electrodes, and
    each of the k areas overlaps one or more transmission electrodes.

7. The electronic device of claim 6, wherein, during a j-th input sensing frame of the k input sensing frames, the sensor controller is configured to not supply the uplink signal to a transmission electrode overlapping a j-th area of the k areas.

8. The electronic device of claim 7, wherein the display panel further comprises:
    data lines configured to receive data signals; and
    a plurality of pixels connected to the scan lines and the data lines.

9. The electronic device of claim 8, wherein the transmission electrodes extend along the scan lines.

10. The electronic device of claim 9, wherein the uplink period of the j-th input sensing frame overlaps a scan period of the scan lines corresponding to the j-th area among the scan lines.

11. The electronic device of claim 9, wherein the uplink period of the j-th input sensing frame does not overlap a scan period of the scan lines corresponding to areas except for the j-th area among the scan lines.

12. The electronic device of claim 3, wherein at least a portion of the k input sensing frames further comprises a downlink period for which the downlink signal is transmitted from the input device through the input sensor.

13. The electronic device of claim 12, wherein the downlink period follows the uplink period.

14. The electronic device of claim 12, wherein the downlink period of a j-th input sensing frame of the k input sensing frames partially overlaps a display frame overlapping a (j+1)-th input sensing frame.

15. The electronic device of claim 12, wherein at least a portion of the k input sensing frames further comprises a response period between the uplink period and the downlink period.

16. The electronic device of claim 15, wherein a k-th input sensing frame of the k input sensing frames comprises only the uplink period and the response period.

17. The electronic device of claim 12, wherein the downlink period of a j-th input sensing frame of the k input sensing frames does not overlap a display frame overlapping a (j+1)-th input sensing frame.

18. An electronic device comprising:
    a display panel configured to display an image during a display frame, the display panel comprising a plurality of scan lines sequentially receiving a scan signal during the display frame;
    an input sensor comprising transmission electrodes on the display panel and reception electrodes that insulately cross the transmission electrodes; and
    a sensor controller configured to operate in a first mode or a second mode different from the first mode, wherein, in the first mode, the sensor controller is configured to transmit an uplink signal to an input device through the input sensor and to receive a downlink signal from the input device through the input sensor,
    wherein an input sensing frame, in which the sensor controller operates in the first mode, comprises an uplink period for which the uplink signal is provided to the input sensor, a start time point of the uplink period during k input sensing frames is shifted or delayed from a start time point of the display frame in a unit of one input sensing frame, and the sensor controller is configured to not apply the uplink signal to a first portion of the transmission electrodes corresponding to a spatial location of one or more scan lines, from among the plurality of scan lines, receiving the scan signal during the uplink period and to apply the uplink signal to a second portion of the transmission electrodes not corresponding to the one or more scan lines during the uplink period, the uplink period overlaps the scan signals applied to the scan lines spatially corresponding to the first portion of the transmission electrodes.

19. The electronic device of claim 18, wherein the input sensor is divided into k areas based on the transmission electrodes, and each of the k areas overlaps one or more transmission electrodes.

20. The electronic device of claim 19, wherein, during a j-th input sensing frame of the k input sensing frames, the sensor controller is configured to not supply the uplink signal to a transmission electrode overlapping a j-th area of the k areas.

* * * * *